United States Patent
Huang et al.

(10) Patent No.: US 10,912,024 B2
(45) Date of Patent: Feb. 2, 2021

(54) APPARATUS, SYSTEM AND METHOD OF A WAKE-UP RADIO (WUR)

(71) Applicant: INTEL IP CORPORATION, Santa Clara, CA (US)

(72) Inventors: Po-Kai Huang, San Jose, CA (US); Daniel Bravo, Portland, OR (US); Noam Ginsburg, Portland, OR (US); Robert Stacey, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 41 days.

(21) Appl. No.: 16/447,022

(22) Filed: Jun. 20, 2019

(65) Prior Publication Data

US 2019/0306792 A1  Oct. 3, 2019

Related U.S. Application Data

(63) Continuation of application No. 16/211,602, filed on Dec. 6, 2018.
(Continued)

(51) Int. Cl.
*H04W 88/10* (2009.01)
*H04W 56/00* (2009.01)
(Continued)

(52) U.S. Cl.
CPC .......... *H04W 52/0206* (2013.01); *H04L 1/18* (2013.01); *H04L 5/0051* (2013.01);
(Continued)

(58) Field of Classification Search
CPC . H04W 52/0206; H04W 88/08; H04W 68/02; H04W 88/10; H04W 72/0446;
(Continued)

(56) References Cited

U.S. PATENT DOCUMENTS 9,730,179 B2 *  8/2017  Aldana ................. H04L 5/0055
9,826,418 B2 * 11/2017  Segev .................... H04W 56/00
(Continued)

OTHER PUBLICATIONS

Office Action for U.S. Appl. No. 16/211,602, dated Jan. 24, 2020, 24 pages.
(Continued)

*Primary Examiner* — Nishant Divecha
(74) *Attorney, Agent, or Firm* — Shichrur & Co.

(57) ABSTRACT

For example, an apparatus configured to cause a first Wake-Up Radio (WUR) wireless communication station (STA) to exchange a request frame and a response frame with a second WUR STA to set up a plurality of WUR parameters of a WUR mode at which the first WUR STA is to transmit one or more WUR wake-up frames configured for reception by a Wake-Up Receiver (WURx) of the second WUR STA, wherein the request frame is from the second WUR STA to the first WUR STA, and the response frame is from the first WUR STA to the second WUR STA in response to the request frame; to transmit an unsolicited update frame to the second WUR STA to update one or more WUR parameters of the plurality of WUR parameters; and to receive an Acknowledgement (Ack) frame from the second WUR STA to acknowledge the unsolicited update frame.

23 Claims, 9 Drawing Sheets

Related U.S. Application Data

(60) Provisional application No. 62/612,155, filed on Dec. 29, 2017, provisional application No. 62/613,645, filed on Jan. 4, 2018.

(51) Int. Cl.
| | |
|---|---|
| *H04W 52/02* | (2009.01) |
| *H04W 72/04* | (2009.01) |
| *H04W 40/24* | (2009.01) |
| *H04L 5/00* | (2006.01) |
| *H04W 68/02* | (2009.01) |
| *H04L 1/18* | (2006.01) |
| *H04W 72/12* | (2009.01) |

(52) U.S. Cl.
CPC ......... *H04L 5/0055* (2013.01); *H04W 40/244* (2013.01); *H04W 56/004* (2013.01); *H04W 68/02* (2013.01); *H04W 72/0446* (2013.01); *H04W 88/10* (2013.01); *H04L 1/1829* (2013.01); *H04W 72/12* (2013.01)

(58) Field of Classification Search
CPC ... H04W 40/244; H04W 56/00; H04W 72/12; H04W 48/10; H04W 84/12; Y02D 30/70; H04J 3/0638; H04L 12/422; H04L 7/00; H04L 1/18; H04L 5/0051; H04L 5/0055; H04L 1/1829; G06F 11/00; G06F 15/00; G06F 2221/2151
See application file for complete search history.

(56) References Cited

U.S. PATENT DOCUMENTS

| | | | | |
|---|---|---|---|---|
| 10,554,251 | B1* | 2/2020 | Chu | H04W 52/0229 |
| 10,674,450 | B2* | 6/2020 | Yang | H04W 52/028 |
| 10,764,855 | B1* | 9/2020 | Chu | H04W 56/0045 |
| 2018/0234918 | A1* | 8/2018 | Asterjadhi | H04W 52/0229 |
| 2018/0249412 | A1 | 8/2018 | Zhou et al. | |
| 2018/0295595 | A1* | 10/2018 | Shellhammer | H04W 52/0206 |
| 2018/0310247 | A1 | 10/2018 | Chu et al. | |
| 2019/0069231 | A1 | 2/2019 | Kneckt et al. | |
| 2019/0075521 | A1 | 3/2019 | Kneckt et al. | |
| 2019/0110250 | A1 | 4/2019 | Huang et al. | |
| 2019/0246356 | A1 | 8/2019 | Kim et al. | |
| 2019/0349857 | A1 | 11/2019 | Kim et al. | |

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

IEEE Std 802.11ah™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Amendment 2: Sub 1 GHz License Exempt Operation, Dec. 7, 2016, 594 pages.

Office Action for U.S. Appl. No. 16/211,602, dated Jun. 15, 2020, 13 pages.

Office Action for U.S. Appl. No. 16/211,602, dated Aug. 18, 2020, 16 Pages.

* cited by examiner

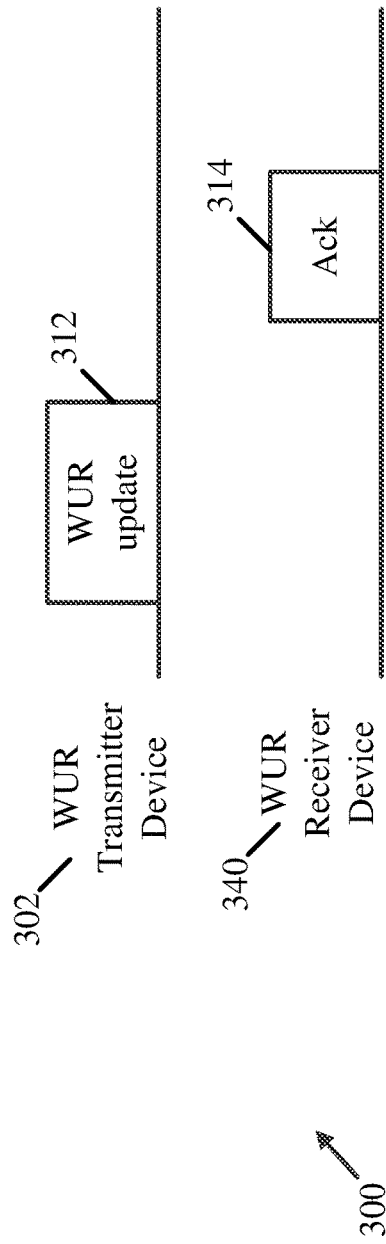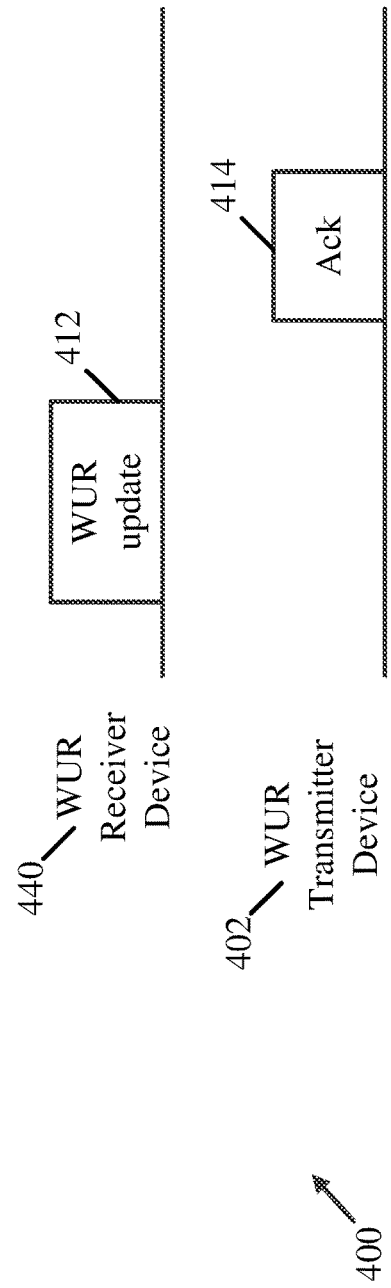

APPARATUS, SYSTEM AND METHOD OF A WAKE-UP RADIO (WUR)

CROSS REFERENCE

This application claims the benefit of and priority from U.S. Provisional Patent Application No. 62/613,645 entitled "WAKE UP RECEIVER TIMING SYNCHRONIZATION FUNCTION UPDATE", filed Jan. 4, 2018, and U.S. Provisional Patent Application No. 62/612,155 entitled "WAKE UP RECEIVER UPDATE", filed Dec. 29, 2017, the entire disclosures of which are incorporated herein by reference.

TECHNICAL FIELD

Embodiments described herein generally relate to a Wake-Up Radio (WUR).

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of a frame exchange between a WUR transmitter and a WUR Receiver, in accordance with some demonstrative embodiments.

FIG. 4 is a schematic illustration of a frame exchange between a WUR transmitter and a WUR Receiver, in accordance with some demonstrative embodiments.

DETAILED DESCRIPTION

Figure 1:
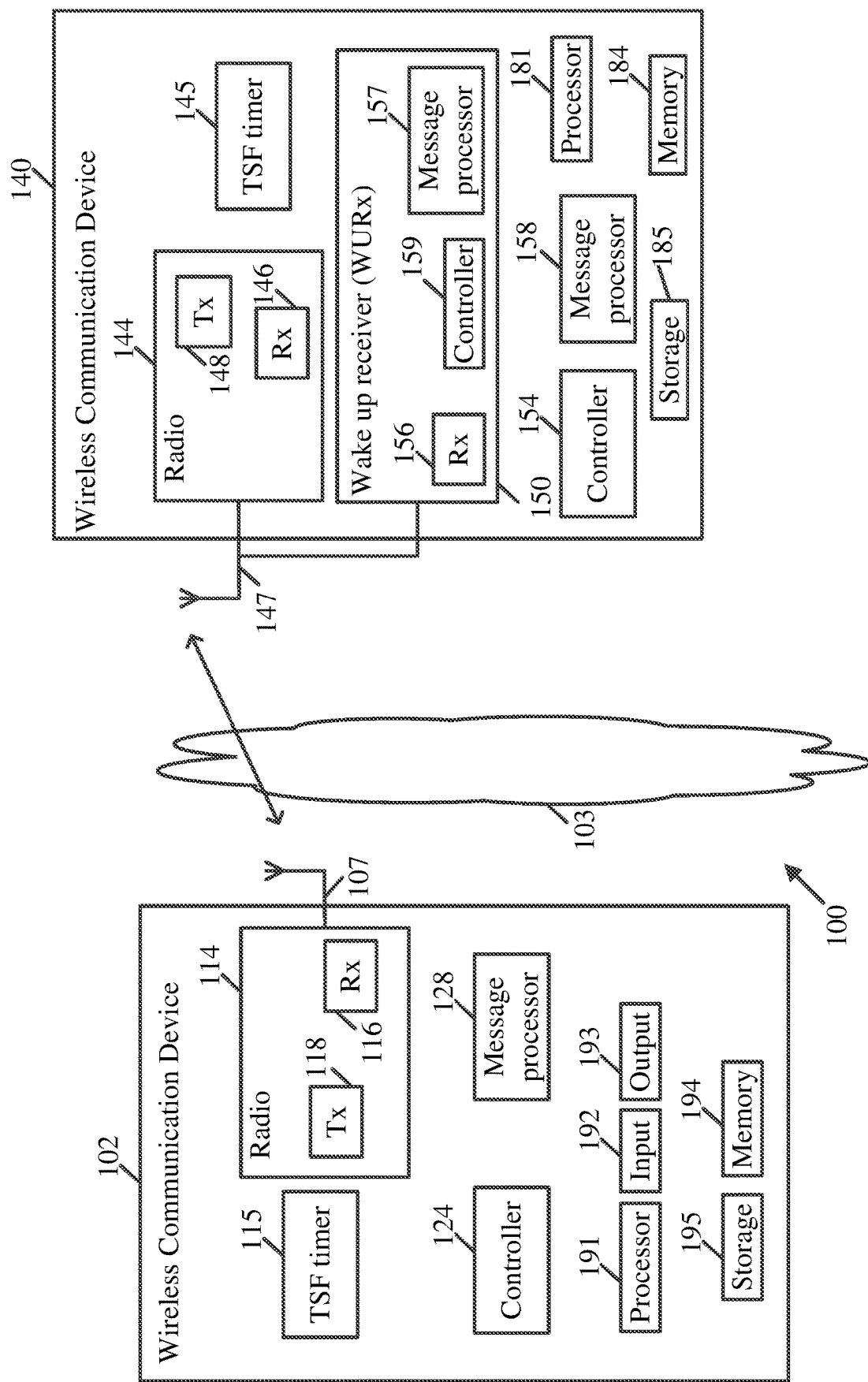
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Dec. 7, 2016); IEEE 802.11ax (IEEE P802.11ax/ D2.0, October 2017, 0 Draft Standard for Information technology—Telecommunications and information exchange between systems Local and metropolitan area networks—Specific requirements, Part 11: Wireless LAN Medium Access Control □(MAC) and Physical Layer (PHY) Specifications, Amendment 6: Enhancements for High Efficiency WLAN)) and/or future versions and/or derivatives thereof) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (including WiFi P2P technical specification, version 1.5, Aug. 4, 3014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 3000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 3G, 3.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In some demonstrative embodiments, device 102 and/or device 140 may include, operate as, and/or perform the functionality of any other devices and/or STAs.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Direct-Sequence Spread Spectrum (DSSS) channel, a BT Low Energy (BLE) channel, a Global Navigation Satellite System (GNSS) Channel, and the like.

In some demonstrative embodiments, WM 103 may include a channel over a 3.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), DSSS, and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140.

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wake-up receiver (WURx) 150 configured to power on and/or to wake up a Primary Connectivity Radio (PCR) of device 140, e.g., radio 144.

In some demonstrative embodiments, wake-up receiver 150 may wake up the PCR of device 140, e.g., radio 144, for example, based on a Wake-Up Radio (WUR) frame, for example, a wake-up packet, e.g., as describe below.

In some demonstrative embodiments, the wake-up packet may be received from another device, e.g., device 102, which is, for example, to transmit data to device 140.

In some demonstrative embodiments, wake-up receiver 150 may include a receiver 156 configured to receive the wake-up packet.

In some demonstrative embodiments, wake-up receiver 150 may include circuitry and/or logic configured to receive, decode, demodulate, and/or process the wake-up packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wake-up receiver 150 may include a controller 159 configured to control one or more operations and/or functionalities of wake-up receiver 150, e.g., for processing the wake-up packet and/or waking up radio 144. For example, controller 159 may be configured to control a power supply of radio 144, and/or any other mechanism to wake up radio 144, e.g., upon determining that a wake-up packet has been received by wake-up receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wake-up receiver 150 may include a message processor 157 configured to process and/or access one or messages communicated by wake-up receiver 150.

In some demonstrative embodiments, message processor 157 may be configured to process one or more WUR frames received by wake-up receiver 150, and/or to indicate to controller 159 that a wake-up packet is received.

In one example, message processor 157 may be configured to access, process, demodulate and/or decode reception of the wake-up packets by a wireless station, e.g., a wireless STA implemented by device 140.

In some demonstrative embodiments, message processor 157 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processor 157, respectively. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wake-up receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a SoC. In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wake-up receiver 150, message processor 158, controller 154, and/or radio 144 may be implemented as part of the chip or SoC.

In other embodiments, radio 144, wake-up receiver 150, controller 154 and/or message processor 158 may be implemented by one or more additional or alternative elements of device 140.

In some demonstrative embodiments, wake-up receiver 150 may be associated with one or more of antennas 147, e.g., which may be shared with radio 144.

In other embodiments, wake-up receiver 150 may include, or may be associated with, another, e.g., separate, antenna.

In some demonstrative embodiments, wake-up receiver 150 may be configured to wake up radio 144, for example, if device 140 has data to transmit, and/or if data is to be received by radio 144.

In one example, wake-up receiver 150 may be configured to implement a low-power wake-up receiver (LP-WUR) scheme, for example, to wake up radio 144, e.g., only when device 140 is to receive data and/or to transmit data.

In some demonstrative embodiments, wake-up receiver 150 may have, for example, a relatively low power consumption, e.g., less than 100 microwatts. Accordingly, the power consumption of device 140 may be reduced for example, during times when there is no data to be received at device 140 and only wake-up receiver 150 is on.

In some demonstrative embodiments, wake-up receiver 150 may wake up radio 144, for example, based on a wake-up packet received from device 102.

In one example, receiver 156 may be configured to receive the wake-up packet from device 102, message processor 156 may be configured to process the wake-up packet, and/or controller 159 may be configured to wake up radio 144.

In some demonstrative embodiments, device 140 may be configured to transmit the wake-up packet to device 102, for example, to indicate to wake up receiver 150 that the PCR of device 140, e.g., radio 144, is to be woken up, e.g., to receive data from device 102.

In some demonstrative embodiments, controller 159 may be configured to cause radio 144 to wake up, e.g., to switch the radio 144 from a doze state, a sleep state or an inactive state to an awake state or an active state, for example, to receive data from device 102, e.g., subsequent to receiving the wake-up packet from device 102.

In some demonstrative embodiments, controller 159 may be configured to cause, control and/or trigger radio 144 to wake up, e.g., to switch the radio 144 from a doze state, a sleep state or an inactive state to an awake state or an active state, for example, to transmit data to device 102 and/or to another device.

In some demonstrative embodiments, device 102 may include an Access-Point (AP) STA.

In some demonstrative embodiments, device 140 may include a non-AP STA.

In some demonstrative embodiments, devices 102 and/or 140 may be configured to communicate one or more WUR frames, for example, in compliance with one or more wireless communication standards and/or protocols, e.g., as described below.

In some demonstrative embodiments, devices 102 and/or 140 may be configured to communicate one or more WUR frames, for example, including one or more types of frames and/or packets, e.g., a wake-up frame, a wake-up beacon and/or one or more other types of frames or packets, e.g., as described below.

In some demonstrative embodiments, devices 102 and/or 140 may be configured to negotiate a plurality of WUR parameters of a WUR mode at which device 102 is to transmit one or more WUR wake-up frames configured for reception by WURx 150 of device 140.

In some demonstrative embodiments, the one or more WUR parameters may include at least a WUR operating channel and/or band, a duty cycle operation parameter, and/or a WUR identifier to identify a WURx, for example, WURx 150 of device 140, e.g., as described below.

In one example, a WUR transmitter, e.g., device 102, may indicate a WUR operating channel and/or a band for sending a wake-up frame and/or other WUR frames, e.g., as described below.

In another example, the WUR transmitter, e.g., device 102, may indicate a WUR identifier that may be used to identify a WUR receiver, e.g., WURx 150, in the wake-up frame, e.g., as described below.

In another example, the WUR transmitter, e.g., device 102, and/or the WUR receiver, e.g., device 140, may agree on one or more duty cycle operation parameters for a WUR duty cycle operation, e.g., as described below.

In other embodiments, any other additional or alternative WUR parameters may be negotiated by devices 102 and/or 140.

In some demonstrative embodiments, the one or more WUR parameters may be agreed, for example, when a WUR receiver, e.g., device 140, requests to setup a WUR operation with a WUR transmitter, e.g., device 102, for example, through a PCR of the WUR receiver, e.g., radio 144, for example, during a negotiation procedure, e.g., as described below.

In some demonstrative embodiments, the negotiation procedure may include exchanging a request frame and a response frame between devices 102 and 140, for example, to set up the plurality of WUR parameters of the WUR mode, e.g., at which WURx 150 may be configured to receive from device 102 the one or more WUR wake-up frames to wake up radio 144.

In some demonstrative embodiments, controller 124 may be configured to cause, control, and/or trigger device 102 and/or radio 114 to exchange the request frame and the response frame with device 140, for example, to set up the plurality of WUR parameters of the WUR mode, e.g., at which device 102 is to transmit one or more WUR wake-up frames configured for reception by WURx 150 of device 140, e.g., as described below.

In some demonstrative embodiments, controller 159 and/or controller 154 may be configured to cause, control, and/or trigger device 140 to exchange the request frame and the response frame with device 102, for example, to set up the plurality of WUR parameters of the WUR mode, e.g., at which WURx 150 may be configured to receive from device 102 the one or more WUR wake-up frames to wake up the PCR of device 140, for example, radio 144, e.g., as described below.

In some demonstrative embodiments, the request frame may be from device 140 to device 102, e.g., as described below.

In some demonstrative embodiments, the response frame may be from device 102 to device 140, e.g., in response to the request frame.

Figure 2:
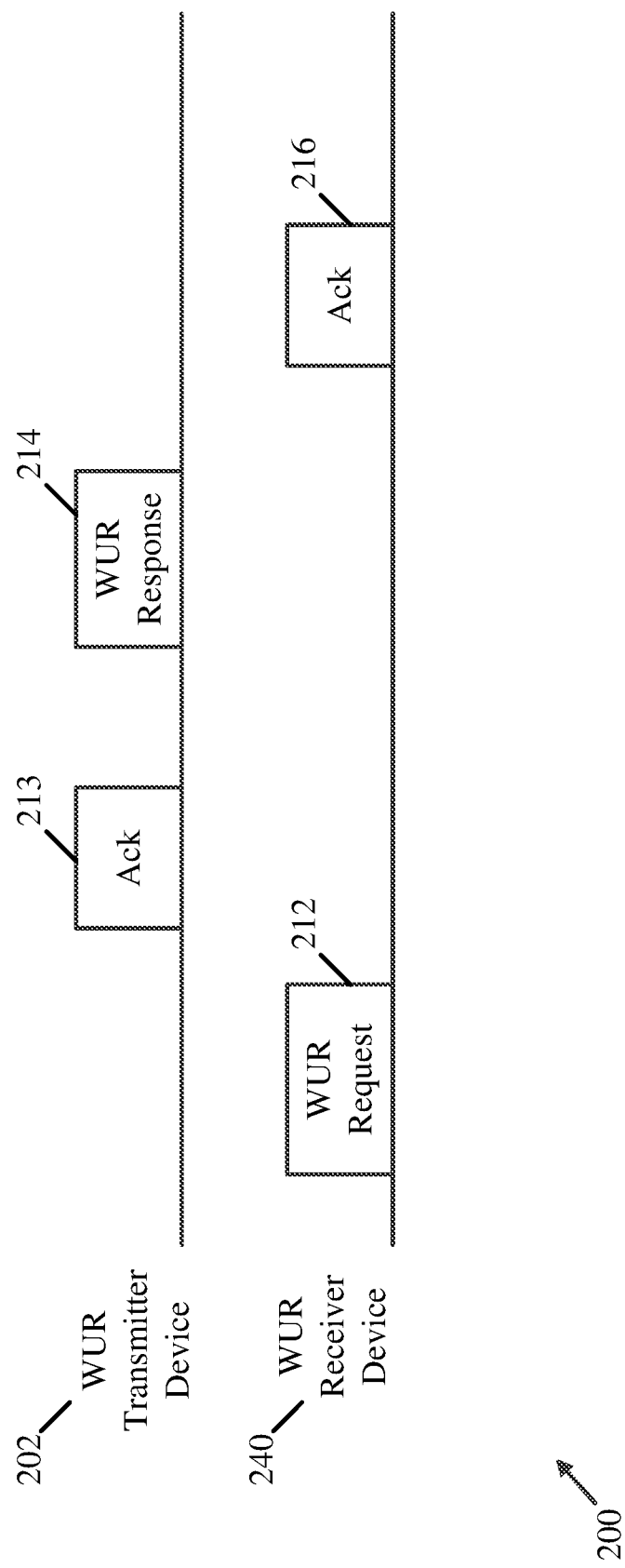
FIG. 2 is a schematic illustration of a frame exchange between a Wake-Up Radio (WUR) transmitter and a WUR Receiver, which may be implemented in accordance with some demonstrative embodiments.

Reference is made to FIG. 2, which schematically illustrates a frame exchange 200 between a WUR transmitter 202 and a WUR Receiver 240, which may be implanted in accordance with some demonstrative embodiments.

In one example, device 102 (FIG. 1) may perform one or more operations, one or more functionalities, the role of, and/or the functionality of, WUR transmitter 202; and/or device 140 (FIG. 1) may perform one or more operations, one or more functionalities, the role, and/or the functionality of, WUR receiver 240.

In some demonstrative embodiments, as shown in FIG. 2, WUR transmitter 202 and WUR receiver 240 may exchange a request frame 212 and a response frame 214, for example, to set up a plurality of WUR parameters of a WUR mode.

In some demonstrative embodiments, as shown in FIG. 2, the request frame 212 may be from WUR receiver 240 to WUR transmitter 202.

In some demonstrative embodiments, the response frame 214 may be from WUR transmitter 202 to WUR receiver 240, e.g., in response to the request frame 212.

In some demonstrative embodiments, as shown in FIG. 2, WUR transmitter 202 may transmit an acknowledge (Ack) frame 213 to WUR receiver 240, e.g., to acknowledge request frame 212.

In some demonstrative embodiments, as shown in FIG. 2, WUR receiver 240 may transmit an Ack frame 216 to WUR transmitter 202, e.g., to acknowledge response frame 214.

In some demonstrative embodiments, WUR request frame 212 and/or WUR response frame 214 may include a WUR Mode element, a WUR operation element, and/or a WUR capability element, e.g., configured to indicate the plurality of WUR parameters of the WUR mode.

In other embodiments, WUR request frame 212 and/or WUR response frame 214 may include any other additional and/or alternative information elements and/or fields to indicate the plurality of WUR parameters of the WUR mode.

Referring back to FIG. 1, in some demonstrative embodiments, devices 102 and/or 140 may be configured to communicate WUR frames according to a data rate, which may be selected, for example, from a plurality of data rates, e.g., as described below.

In some demonstrative embodiments, two data rates may be defined, e.g., in accordance with an IEEE802.11ba Standard, for a transmission of a WUR frame. The two data rates may include a first data rate, e.g., a high data rate, for example, of 356 kilo-bit-per-second (kbps) and/or a second data rate, e.g., a low data rate, for example, of 62.5 kbps. The High data rate may be used, for example, in a first scenario where a WUR receiver is close to a WUR transmitter, e.g., when range is not an issue. The low data rate may be used in a second scenario where the WUR receiver is far away from the WUR transmitter, e.g., when range and robustness are a top priority. For example, the high data rate may enable to deliver a same amount of data in a shorter time, e.g., compared to the low data rate.

In other embodiments, the data rate may be selected according to any other additional or alternative criterion, and/or any other rates may be used.

In some demonstrative embodiments, devices 102 and/or 140 may be required to change one or more parameters of the WUR mode, for example, after setup of the WUR mode, e.g., after frame exchange 200 (FIG. 2), for example, even without a need to renegotiate the WUR mode, e.g., as described below.

In one example, a WUR transmitter, for example, an AP, e.g., device 102, may want to update the WUR operating channel, reassign the WUR identifier in wake-up frame, update the one or more duty cycle operation parameters and/or update one or ore other WUR parameters.

In another example, a WUR receiver, for example, a STA, e.g., device 140, may want to update its preference for data rate selection, e.g., to switch from the high data rate to the low data rate and vice versa.

In another example, a WUR transmitter, for example, an AP, e.g., device 102, may want to temporarily stop a wake-up radio service for a WURx, e.g., for WURx 150.

In some demonstrative embodiments, updating the plurality of WUR parameters by a WUR receiver by letting the WUR receiver renegotiate the WUR mode with the WUR transmitter may not be effective, e.g., as described below.

In some demonstrative embodiments, updating the plurality of WUR parameters by a WUR transmitter by letting the WUR transmitter to tear down the negotiated WUR operation and wait for the WUR receiver to renegotiate the WUR operation may not be effective.

In one example, renegotiation of WUR operation parameters may not be the most efficient way of updating the WUR parameters.

In some demonstrative embodiments, it may be advantageous to allow a WUR receiver to indicate preference of data rate reception. For example, without an indication of a preference for the data rate, an application, e.g., a close range application, e.g., for devices like watches or the like, may not be able to increase performance and/or robustness of the application.

In some demonstrative embodiments, it may be advantageous to allow a WUR transmitter to temporarily stop the WUR operation. For example, without an indication from the WUR transmitter to temporarily stop the WUR operation, the WUR transmitter may not be able to prevent continuous requests from a WUR receiver.

In some demonstrative embodiments, devices 102 and/or 140 may be configured to implement a signaling mechanism, which may enable and/or support one or more ways of updating the plurality of WUR parameters, e.g., as described below.

In some demonstrative embodiments, devices 102 and/or 140 may be configured to communicate an unsolicited update frame from a WUR transmitter, e.g., from device 102, for example, to update the plurality of WUR parameters, e.g., as described below.

In one example, at least one update rule may be defined to update one or more WUR parameters of the plurality of WUR parameters, e.g., as described below.

In some demonstrative embodiments, devices 102 and/or 140 may be configured to support a signaling mechanism, which may enable a WUR receiver, e.g., device 140, to indicate a preference of data rate reception, for example, to a WUR transmitter, e.g., device 102.

In some demonstrative embodiments, devices 102 and/or 140 may be configured to support a signaling mechanism, which may enable a WUR transmitter, e.g., device 102, to temporarily stop the WUR operation, e.g., as described below.

In some demonstrative embodiments, the unsolicited update frame may enable the WUR transmitter to update the plurality of WUR parameters, for example, even without tearing down of the WUR mode, e.g., as described below.

In some demonstrative embodiments, the unsolicited update frame may be configured to enable the WUR receiver to understand that the unsolicited update frame from WUR transmitter is for an update purpose, e.g., as described below.

In some demonstrative embodiments, a WUR receiver, e.g., device 140, may be configured to indicate, e.g., to a WUR transmitter, a preference of data rate reception and/or help the WUR transmitter to choose a most efficient rate, e.g., as described below.

In some demonstrative embodiments, a WUR transmitter, e.g., device 102, may be configured to temporarily stop a WUR operation, e.g., for implementation specific reasons, and/or to enable the WUR operation later, e.g., as described below.

In some demonstrative embodiments, devices 102 and 140 may exchange a request frame and a response frame, e.g., request frame 212 (FIG. 2) and response frame 214 (FIG. 2), for example, to set up a plurality of WUR parameters of the WUR mode, e.g., at which WURx 150 may be configured to receive from device 102 the one or more WUR wake-up frames to wake up WURx 150, e.g., as described below.

In some demonstrative embodiments, the request frame may be from device 140 to device 102, e.g., as described below.

In some demonstrative embodiments, the response frame may be from device 102 to device 140, e.g., in response to the request frame.

In some demonstrative embodiments, controller 124 may be configured to cause, control, and/or trigger device 102 and/or radio 114 to exchange the request frame and the response frame with a PCR of device 140, e.g., radio 144, and to transmit the unsolicited update frame to the PCR of device 140, e.g., as described below.

In some demonstrative embodiments, the one or more WUR parameters may include a WUR operating channel, a duty cycle operation parameter, and/or a WUR identifier to identify the WURx 150.

In some demonstrative embodiments, the one or more WUR parameters may include any other additional or alternative WUR parameters.

In some demonstrative embodiments, controller 124 may be configured to cause, control, and/or trigger device 102 and/or radio 114 to transmit an unsolicited update frame to device 140 to update one or more WUR parameters of the plurality of WUR parameters, e.g., as described below.

In some demonstrative embodiments, controller 124 may be configured to cause, control, and/or trigger device 102 and/or radio 114 to receive an Acknowledgement (Ack) frame from device 140, for example, to acknowledge the unsolicited update frame, e.g., as described below.

In some demonstrative embodiments, the unsolicited update frame may include a WUR mode element, for example, including an action type field to indicate the update of the one or more WUR parameters, e.g., as described below.

In other embodiments, the unsolicited update frame may include any other additional or alternative information elements and/or fields, e.g., as described below.

In some demonstrative embodiments, the unsolicited update frame may be unsolicited by another request from device 140, e.g., as described below.

In some demonstrative embodiments, the unsolicited update frame may include a countdown field, for example, to indicate a remaining time to update the one or more WUR parameters, e.g., as described below.

In some demonstrative embodiments, the countdown field may be configured to indicate a count of remaining Target Beacon Transmission Time (TBTT) intervals to update the one or more WUR parameters, e.g., as described below.

In some demonstrative embodiments, the countdown field may be configured to indicate a remaining time to update the WUR operating channel, e.g., as described below.

In some demonstrative embodiments, the unsolicited update frame may include a WUR operating channel switch element to indicate a WUR operating channel switch, e.g., as described below.

In other embodiments, the unsolicited update frame may include any other element to indicate the WUR operating channel switch, e.g., as described below.

In some demonstrative embodiments, the unsolicited update frame may include a WUR mode disable field configured to indicate that the WUR mode is to be disabled, e.g., as described below.

In some demonstrative embodiments, controller 124 may be configured to cause, control, and/or trigger device 102 and/or radio 114 to transmit the one or more WUR wake-up frames, for example, according to the one or more WUR parameters, e.g., as described below.

In some demonstrative embodiments, device 140 may receive the unsolicited update frame from device 102, e.g., as described below.

In some demonstrative embodiments, controller 159 and/or controller 154 may be configured to cause, control, and/or trigger device 140 and/or radio 144 to process the unsolicited update frame from device 102 to update the one or more WUR parameters of the plurality of WUR parameters, e.g., as described below.

In some demonstrative embodiments, controller 159 and/or controller 154 may be configured to cause, control, and/or trigger device 140 and/or radio 144 to process the unsolicited update frame from device 102 including the WUR mode element including the action type field to indicate the update of the one or more WUR parameters, e.g., as described below.

In some demonstrative embodiments, controller 159 and/or controller 154 may be configured to cause, control, and/or trigger radio 154 to transmit the Ack frame to device 102 to acknowledge the unsolicited update frame, e.g., as described below.

In some demonstrative embodiments, controller 159 and/or controller 154 may be configured to cause, control, and/or trigger device 140 to update the one or more WUR parameters based on the unsolicited update frame, e.g., as described below.

In some demonstrative embodiments, controller 159 and/or controller 154 may be configured to cause, control, and/or trigger device 140 and/or WURx 150 to receive the one or more WUR wake-up frames, e.g., from device 102, based on the one or more WUR parameters, e.g., as described below.

In some demonstrative embodiments, controller 159 and/or controller 154 may be configured to cause, control, and/or trigger device 140 to determine a remaining time to update the one or more WUR parameters, for example, based on the countdown field in the unsolicited update frame, and/or to update the one or more WUR parameters, for example, based on the remaining time, e.g., as described below.

In some demonstrative embodiments, controller 159 and/or controller 154 may be configured to cause, control, and/or trigger device 140 to determine a number of remaining TBTT intervals to update the one or more WUR parameters, for example, based on the countdown field in the unsolicited update frame, e.g., as described below.

In some demonstrative embodiments, controller 159 and/or controller 154 may be configured to cause, control, and/or trigger device 140 to update the WUR operating channel, for example, based on the remaining time, e.g., as described below.

In some demonstrative embodiments, controller 159 and/or controller 154 may be configured to cause, control, and/or trigger device 140 to update the WUR operating channel, for example, based on the WUR operating channel switch element that indicates the WUR operating channel switch in the unsolicited update frame, e.g., as described below.

In some demonstrative embodiments, controller 159 and/or controller 154 may be configured to cause, control, and/or trigger device 140 to disable the WUR mode, for example, based on the WUR mode disable field in the unsolicited update frame, e.g., as described below.

In some demonstrative embodiments, devices 102 and/or 140 may be configured to communicate a message including an indication of a preferred data rate, for example, for communication of the WUR wake-up frames, e.g., as described below.

In some demonstrative embodiments, controller 159 and/or controller 154 may be configured to cause, control, and/or trigger device 140 to transmit to device 102 a message including an indication of a preferred data rate, e.g., as described below.

In some demonstrative embodiments, controller 124 may be configured to cause, control, and/or trigger device 102 and/or radio 114 to process the message from device 140 including the indication of the preferred data rate, and to transmit the one or more WUR wake-up frames, e.g., to device 140, for example, according to the preferred data rate, e.g., as described below.

In some demonstrative embodiments, controller 159 and/or controller 154 may be configured to cause, control, and/or trigger device 140 to process the one or more WUR wake-up frames, e.g., from device 102, according to the preferred data rate, e.g., as described below.

In some demonstrative embodiments, the unsolicited update frame may include a management frame including a WUR mode element.

In some demonstrative embodiments, a field in an action type of the WUR mode element in the unsolicited update frame may be used to indicate a WUR update, e.g., to update the plurality of WUR parameters.

In some demonstrative embodiments, the unsolicited update frame may include a WUR mode element, a WUR operation element, or a WUR capability element, which may be configured to indicate the plurality of WUR parameters to be updated.

In some demonstrative embodiments, a WUR transmitter, e.g., device 102, may be configured to address a group, e.g., without requirement of an acknowledgement. For example, certain WUR parameters may be allowed to be updated through a group addressed transmission.

In some demonstrative embodiments, a WUR operating channel switch element, e.g., a separate element, may be defined, e.g., specifically, for a WUR operating channel switch.

In some demonstrative embodiments, a countdown field may be configured to indicate a remaining amount of time for updating some or all, e.g., a specific subset, of the plurality of WUR parameters.

In some demonstrative embodiments, the one or more WUR parameters that may be updated by the countdown field may include the WUR operating channel and/or any other parameter.

In one example, the countdown field may be configured to indicate a remaining number of TBTTs for updating the one or more WUR parameters.

In some demonstrative embodiments, a field, e.g., the WUR mode disable field and/or any other field, in the unsolicited update frame may be used to indicate if a WUR transmitter, e.g., device 102, is to disable a WUR operation service, e.g., provided to device 140. For example, the field may be included as part of the WUR mode element, the WUR operation element, the WUR capability element, or any other element.

In some demonstrative embodiments, a WUR receiver, e.g., device 140, may be configured to indicate a data rate preference for WUR operation, for example, in a predefined field. For example, the predefined field may be included as part of a WUR mode element, a WUR operation element, or a WUR capability element, for example, in the message from device 140 to device 102 including the indication of the preferred data rate.

Reference is made to FIG. 3, which schematically illustrates a frame exchange 300 between a WUR transmitter 302 and a WUR Receiver 340, in accordance with some demonstrative embodiments.

In one example, device 102 (FIG. 1) may perform one or more operations, one or more functionalities, the role of, and/or the functionality of, WUR transmitter 302; and/or device 140 (FIG. 1) may perform one or more operations, one or more functionalities, the role, and/or the functionality of, WUR receiver 340.

In some demonstrative embodiments, as shown in FIG. 3, WUR transmitter 302 may transmit an unsolicited update frame 312 to WUR receiver 340, e.g., to update one or more parameters of a WUR mode.

In some demonstrative embodiments, as shown in FIG. 3, WUR receiver 340 may transmit an Ack frame 314 to WUR transmitter 302, e.g., to acknowledge unsolicited update frame 312.

In some demonstrative embodiments, as shown in FIG. 3, unsolicited update frame 312 may be unsolicited by a request from WUR receiver 340.

Reference is made to FIG. 4, which schematically illustrates a frame exchange 400 between a WUR transmitter 402 and a WUR Receiver 440, in accordance with some demonstrative embodiments.

In one example, device 102 (FIG. 1) may perform one or more operations, one or more functionalities, the role of, and/or the functionality of, WUR transmitter 402; and/or device 140 (FIG. 1) may perform one or more operations, one or more functionalities, the role, and/or the functionality of, WUR receiver 440.

In some demonstrative embodiments, as shown in FIG. 4, WUR receiver 440 may transmit an unsolicited update frame 412 to WUR transmitter 402, e.g., to indicate a preferred data rate and/or to update one or more parameters of the WUR mode.

In some demonstrative embodiments, as shown in FIG. 4, WUR transmitter 402 may transmit an Ack frame 414 to WUR receiver 440, e.g., to acknowledge unsolicited update frame 412.

In some demonstrative embodiments, as shown in FIG. 4, unsolicited update frame 412 may be unsolicited by a frame from WUR transmitter 402.

Referring back to FIG. 1, in some demonstrative embodiments, WURx 150 may be configured to operate according to a WUR duty cycle o, for example, to consume less power, e.g., as described below.

In some demonstrative embodiments, the WUR duty cycle operation may include an operation in which WURx 150 is turned on and off periodically, e.g., as described below.

Figure 5:
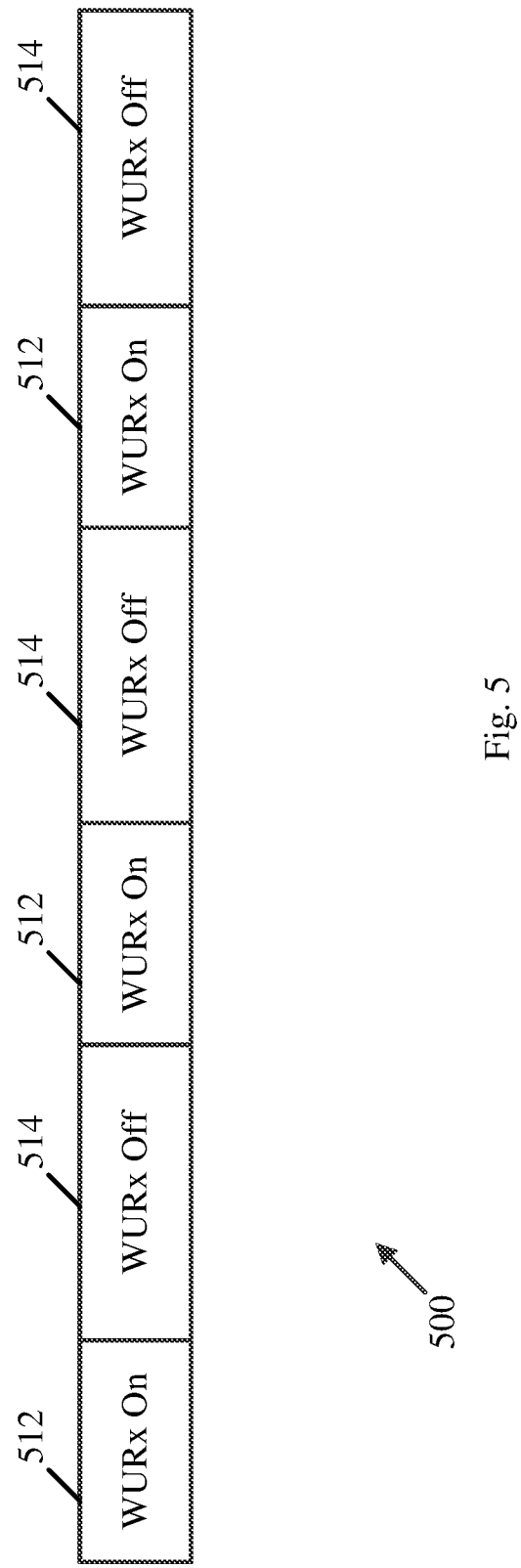
FIG. 5 is a schematic illustration of a duty cycle operation, which may be implemented in accordance with some demonstrative embodiments.

Reference is made to FIG. 5, which schematically illustrates a WUR duty cycle operation 500, which may be implemented in accordance with some demonstrative embodiments.

In some demonstrative embodiments, as shown in FIG. 5, during duty cycle operation 500, a WURx may be periodically switched between on periods 512, during which the WURx may be turned on, and off periods 514, during which the WURx may be turned off.

In some demonstrative embodiments, a WUR transmitter, e.g., device 102 (FIG. 1), and a WUR receiver, e.g., device 140 (FIG. 1), may synchronize on a common timing point, for example, in order to support and/or enable the duty cycle operation, e.g., as described below.

In some demonstrative embodiments, the common timing point may be based on a value of a Time Synchronization Function (TSF), e.g., in accordance with an IEEE802.11 Standard.

In some demonstrative embodiments, a WUR transmitter, e.g., device 102, may be configured to transmit, e.g. periodically, a WUR beacon including a partial TSF value, for example, to enable a synchronization to a TSF of the WUR transmitter.

In one example, the partial TSF value may include TSF bits of the TSF value, e.g., from a first bit position, denoted "X", to a second bit position, denoted "Y", where Y>X.

Figure 6:
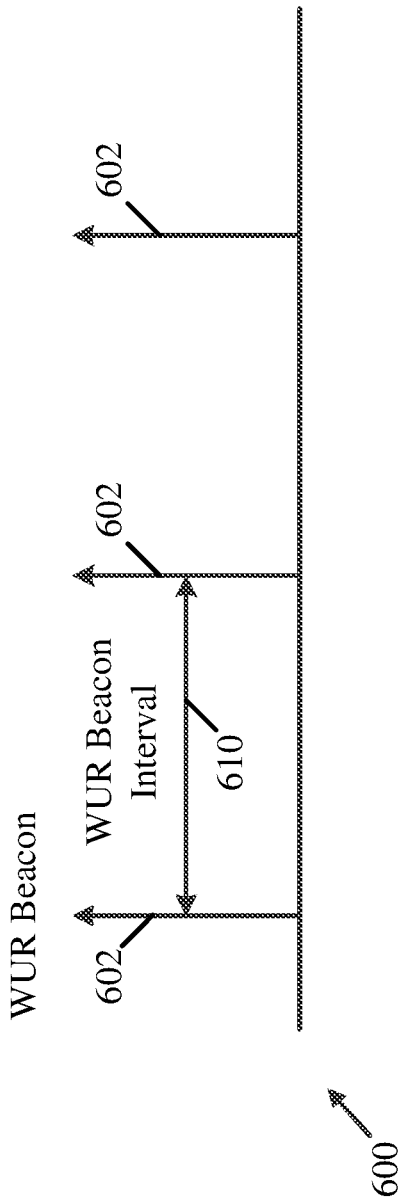
FIG. 6 is a schematic illustration of a WUR beacon transmission, which may be implemented in accordance with some demonstrative embodiments.

Reference is made to FIG. 6, which schematically illustrates a WUR beacon transmission 600, which may be implemented in accordance with some demonstrative embodiments.

In some demonstrative embodiments, a WUR transmitter, e.g., device 102 (FIG. 1), may periodically transmit WUR beacon 602, e.g., every WUR beacon interval 610.

Figure 7:
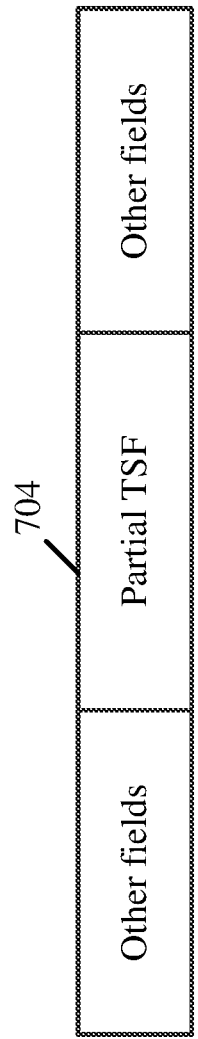
FIG. 7 is a schematic illustration of a frame format of a WUR beacon, which may be implemented in accordance with some demonstrative embodiments.

Reference is made to FIG. 7, which schematically illustrates a frame format 700 of a WUR beacon, which may be implemented in accordance with some demonstrative embodiments.

In one example, a WUR transmitter, e.g., device 102 (FIG. 1), may periodically transmit WUR beacon 602 (FIG. 6) including frame format 700.

In some demonstrative embodiments, frame format 700 of the WUR beacon may include a partial TSF field 704 including a partial TSF value of a TSF timer, e.g., of the WUR transmitter.

Referring back to FIG. 1, in some demonstrative embodiments, a WUR receiver may be configured to receive in a WUR beacon frame from a WUR transmitter a partial TSF value of a TSF timer of the WUR transmitter. For example, device 140 may be configured to receive from device 102 the WUR beacon 602 (FIG. 6) including partial TSF field 704 (FIG. 7), which may include a partial TSF value of a TSF timer 115 of device 102.

In some demonstrative embodiments, the WUR receiver may be configured to update a local TSF timer of the WUR receiver, for example, based on the received partial TSF value in the WUR beacon frame from the WUR transmitter. For example, device 140 may be configured to update a local TSF timer 145 of device 140, for example, based on the received partial TSF value in the partial TSF field 704 (FIG. 7) of WUR beacon 602 (FIG. 6).

In some demonstrative embodiments, the WUR receiver may be configured to update the local TSF timer of the WUR receiver, for example, by considering a local time delay, e.g., of the WUR receiver.

In some demonstrative embodiments, the WUR receiver may be configured to adjust the partial TSF value, e.g., a received timestamp, based on the local time delay, e.g., as follows:

The received Timestamp value shall be adjusted by adding an amount equal to the receiving STA's delay through its local PHY components plus the time since the first bit of the Timestamp field was received at the MAC/PHY interface.

In some demonstrative embodiments, there may be a need to provide a technical solution for updating the local TSF timer of the WUR receiver based on the received partial TSF value in the WUR beacon frame, e.g., accurately, for example, when the partial TSF value does not include a least significant bit of the TSF timer of the WUR transmitter.

In one example, a partial TSF value carried in a WUR Beacon may not carry the least significant bit. For example, a bit location of the partial TSF may be bit 8 to bit 15 or bit 15 to bit 31, e.g., without bit locations 0-7 or 0-14. Therefore, a value for bit locations 0-7 or 0-14 may need to be assumed, e.g., before an adjustment based on the local time delay can be made.

In some demonstrative embodiments, devices 102 and/or 140 may be configured to support an adjustment procedure to update a local TSF timer, e.g., TSF timer 145, based on a partial TSF from device 102, e.g., in a WUR Beacon, that does not include one or more LSBs of TSF timer 115, e.g., as described below.

In some demonstrative embodiments, a WUR receiver, for example, a non-AP STA, e.g., device 140, may be configured to append a value for bit locations 0 to X−1, of a TSF timer, when the partial TSF value in the WUR beacon frame includes bit positions from X to Y, e.g., where Y>X, for example, before performing a local adjustment at the WUR receiver, e.g., as described below.

In some demonstrative embodiments, the appended value may include a predefined value, e.g., or a default value, which may be defined, for example, in a specification.

In some demonstrative embodiments, the predefined value may include one of the following values:
    0, i.e., all bits equal to 0
    $2^{X}-1$, i.e., all bits equal to 1
    $2^{(X-1)}$
    $2^{(X-1)}+1$
    $2^{(X-1)}-1$ In some demonstrative embodiments, the appended value may include an implementation specific value for the non-AP STA.

In other embodiments, the predefined value may include any other value.

In some demonstrative embodiments, the adjustment procedure may be configured to update a local TSF, e.g., at the non-AP STA, for example, while considering the local error due to a PHY delay, e.g., as described below.

In some demonstrative embodiments, the predefined value may be configured to minimize a TSF error. For example, a predefined value, for example, around $2^{(X-1)}$, may minimize the TSF error to be at most $2^{(X-1)}$ microseconds (us), which may reduce the TSF error, for example, compared to a value of 0 or $2^X-1$, which may result in a larger TSF error, e.g., around plus $2^X$us or minus $2^X$us.

In some demonstrative embodiments, devices 102 and/or 140 may be configured to support the adjustment procedure for a partial TSF timer value, e.g., as described below.

In one example, device 102 may be configured to transmit a WUR beacon frame including a partial TSF value, and/or device 140 may be configured to process and/or to adjust the partial TSF value, e.g., as describe below.

In some demonstrative embodiments, controller 124 may be configured to cause, control, and/or trigger device 102 and/or radio 114 to transmit a WUR beacon frame including a partial TSF value of the TSF timer 115 of device 102, the partial TSF value including a partial sequence of TSF bits of the TSF timer 115 from a first bit position to a second bit position, e.g., as described below.

In some demonstrative embodiments, controller 159 and/or controller 154 may be configured to cause, control, and/or trigger device 140 to process the WUR beacon frame from device 102 including the partial TSF value of the TSF timer 115 of device 102, the partial TSF value including the partial sequence of TSF bits of the TSF timer 115 from the first bit position to the second bit position, e.g., as described below.

In some demonstrative embodiments, controller 159 and/or controller 154 may be configured to cause, control, and/or trigger device 140 to generate a temporal value by concatenating a predefined bit sequence with the partial sequence of TSF bits, e.g., as described below.

In some demonstrative embodiments, the predefined bit sequence may represent assumed bits from a bit position zero to a bit position, which is immediately before the first bit position, e.g., as described below.

In some demonstrative embodiments, a count of bits in the predefined bit sequence may be equal to a count of bits from a zero bit position to a bit position, which is immediately before the first bit position, e.g., as described below.

In some demonstrative embodiments, the predefined bit sequence may include an implementation specific value, e.g., as described below.

In some demonstrative embodiments, controller 159 and/or controller 154 may be configured to cause, control, and/or trigger device 140 to determine an adjusted temporal value by adjusting the temporal value, for example, based on a local PHY delay of device 140, e.g., as described below.

In some demonstrative embodiments, controller 159 and/or controller 154 may be configured to cause, control, and/or trigger device 140 to determine the adjusted temporal value, for example, by adding to the temporal value a sum of the local PHY delay of the first WUR STA and a time since reception of a first bit of the partial TSF value at a MAC/PHY interface of device 140, e.g., as described below.

In some demonstrative embodiments, controller 159 and/or controller 154 may be configured to cause, control, and/or trigger device 140 to determine an adjusted partial TSF value including bits of the adjusted temporal value from the first bit position to the second bit position, e.g., as described below.

In some demonstrative embodiments, controller 159 and/or controller 154 may be configured to cause, control, and/or trigger device 140 to set the local TSF timer 145 of device 140, for example, based on the adjusted partial TSF value, for example, by setting bits of the local TSF timer 145 from the first bit position to the second bit position to the adjusted partial TSF value, e.g., as described below.

In some demonstrative embodiments, controller 159 and/or controller 154 may be configured to cause, control, and/or trigger device 140 to determine a duty cycle of WURx 150, for example, based on the local TSF timer, e.g., as described below.

In some demonstrative embodiments, device 102 may be configured to adjust Most Significant bits (MSBs) of the local TSF timer 145, e.g., as described below.

In some demonstrative embodiments, controller 159 and/or controller 154 may be configured to cause, control, and/or trigger device 140 to adjust a sequence of MSBs of the local TSF timer 145 from a bit position immediately after the second bit position, for example, based on a comparison between an MSB of the adjusted partial TSF value and a bit of the local TSF timer at the second bit position, e.g., as described below.

In some demonstrative embodiments, controller 159 and/or controller 154 may be configured to cause, control, and/or trigger device 140 to adjust the sequence of MSBs of the local TSF timer 145, for example, when the MSB of the adjusted partial TSF value is not equal to the bit of the local TSF timer 145 at the second bit position, e.g., as described below.

In one example, device 102 may transmit a WUR frame, e.g., a WUR beacon frame, including a partial TSF value from a bit position "X" to a bit position "Y" of the TSF, where Y>X, e.g., as follows:

The Partial TSF field, e.g., in the WUR frame, may include the bits X to Y of the a TSF timer of a transmitting STA at the time that the start of the data symbol, containing the first bit of the Timestamp, is transmitted by the PHY plus the delays of the transmitting STA through its local PHY from the MAC-PHY interface to its interface with the WM.

In one example, a non-AP STA, e.g., device 140, may receive a WUR frame, e.g., a WUR beacon frame, e.g., from device 102, including the partial TSF value bit position X to Y of the TSF, where Y>X. According to this example, device 140 may be configured to perform one or more of the following operations:

The received partial TSF value may be adjusted by:
  Create a temporal timer, e.g., by concatenating the received partial TSF with X bits containing value that represents the assumed value of bit position 0 to X−1
    The assumed value can be a default value defined by a specification including but not limited to the following value:
      0, i.e., all bits equal to 0
      $2^X-1$, i.e., all bits equal to 1
      $2^{(X-1)}$, i.e., only bit position X equal to 1
      $2^{(X-1)}+1$, i.e., only bit position X and 0 equal to 1
      $2^{(X-1)}-1$, i.e., only bit position X equal to 0
    The value can be implementation specific for the STA
  Add an amount equal to delay of the receiving STA through its local PHY components plus the time since the first bit of the Timestamp field was received at the MAC/PHY interface to the temporal timer
  Extract the value of bit position X to Y of the temporal timer as the adjusted value of the received partial TSF If the Most Significant Bit (MSB) of the adjusted value of the received partial TSF is not equal to the bit Y of the local TSF timer then the value of bits Y+1 to 63 of the local TSF timer shall be adjusted to account for roll over as follows:

The value shall be increased by one unit (modulo $2^{(63-Y)}$) if LT[X:Y]>AT and LT[X:Y]>AT+$2^{(Y-X)}$ The value shall be decreased by one unit (modulo $2^{(63-Y)}$) if LT[X:Y]<AT and LT[X:Y]<AT-$2^{(Y-X)}$ where AT denotes the adjusted value of the received partial TSF and LT[X:Y] denotes the value of bits X to Y of the local TSF timer The bits X to Y of the local TSF timer of the STA shall be set to the adjusted value of the received partial TSF.

Figure 8:
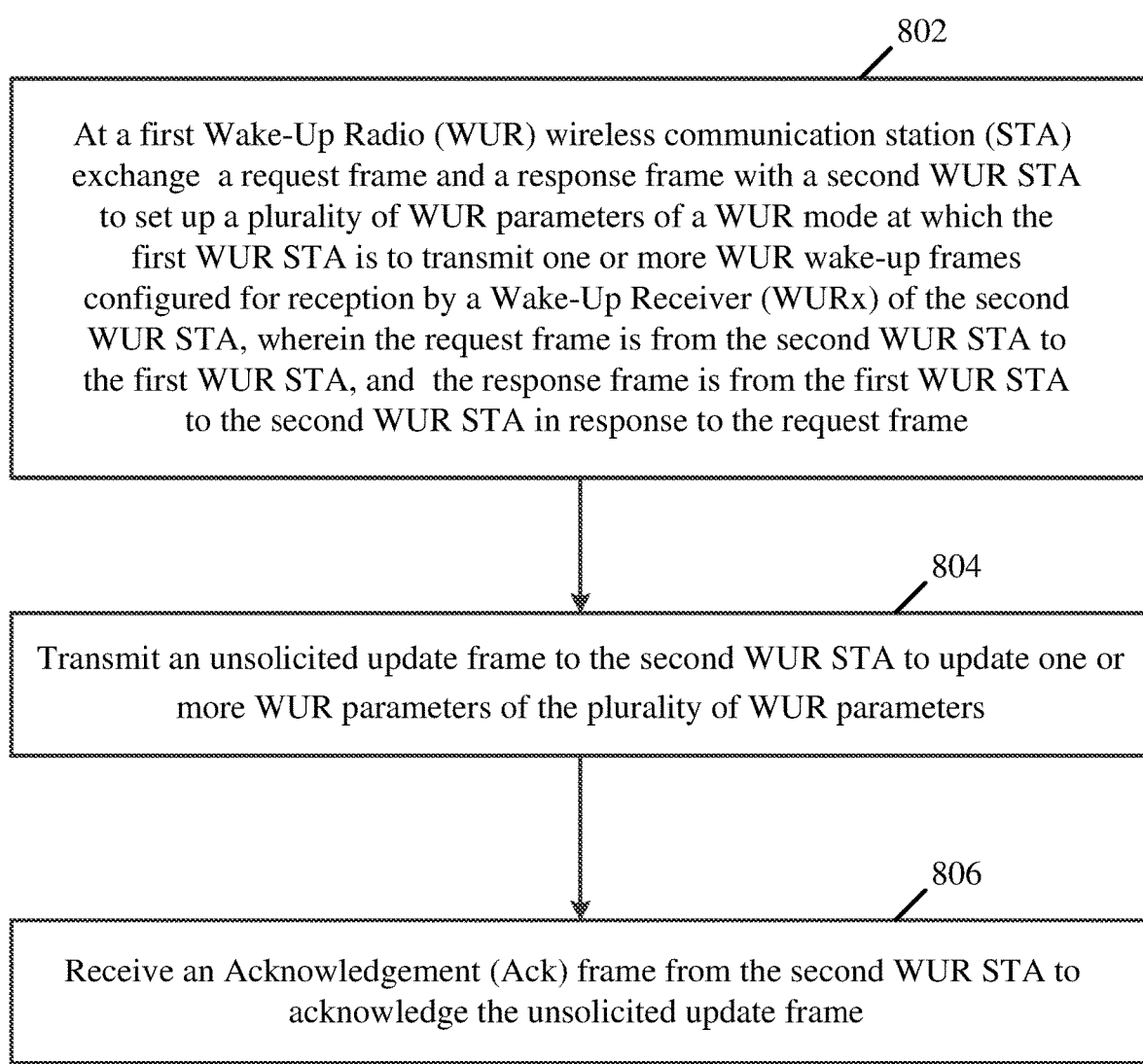
FIG. 8 is a schematic flow-chart illustration of a method of WUR, in accordance with some demonstrative embodiments.

Reference is made to FIG. 8, which schematically illustrates a method of WUR, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1) and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wake-up receiver, e.g., wake-up receiver 150 (FIG. 1); and/or a message processor, e.g., message processor 157 (FIG. 1), message processor 128 (FIG. 1) and/or message processor 158 (FIG. 1).

As indicated at block 802, the method may include exchanging at a first WUR STA a request frame and a response frame with a second WUR STA to set up a plurality of WUR parameters of a WUR mode at which the first WUR STA is to transmit one or more WUR wake-up frames configured for reception by a WURx of the second WUR STA, wherein the request frame is from the second WUR STA to the first WUR STA, and the response frame is from the first WUR STA to the second WUR STA in response to the request frame. For example, controller 124 (FIG. 1) may control, cause and/or trigger device 102 (FIG. 1) to exchange the request frame and the response frame with device 140 (FIG. 1) to set up the plurality of WUR parameters of the WUR mode at which device 102 (FIG. 1) is to transmit one or more WUR wake-up frames configured for reception by WURx 150 (FIG. 1), the request frame may be from device 140 (FIG. 1) to device 102 (FIG. 1), and the response frame may be from device 102 (FIG. 1) to device 140 (FIG. 1) in response to the request frame, e.g., as described above.

As indicated at block 804, the method may include transmitting an unsolicited update frame to the second WUR STA to update one or more WUR parameters of the plurality of WUR parameters. For example, controller 124 (FIG. 1) may control, cause and/or trigger radio 114 (FIG. 1) to transmit the unsolicited update frame to device 140 (FIG. 1) to update the one or more WUR parameters of the plurality of WUR parameters, e.g., as described above.

As indicated at block 806, the method may include receiving an Ack frame from the second WUR STA to acknowledge the unsolicited update frame. For example, controller 124 (FIG. 1) may control, cause and/or trigger radio 114 (FIG. 1) to receive the Ack frame from device 140 (FIG. 1) to acknowledge the unsolicited update frame, e.g., as described above.

Figure 9:
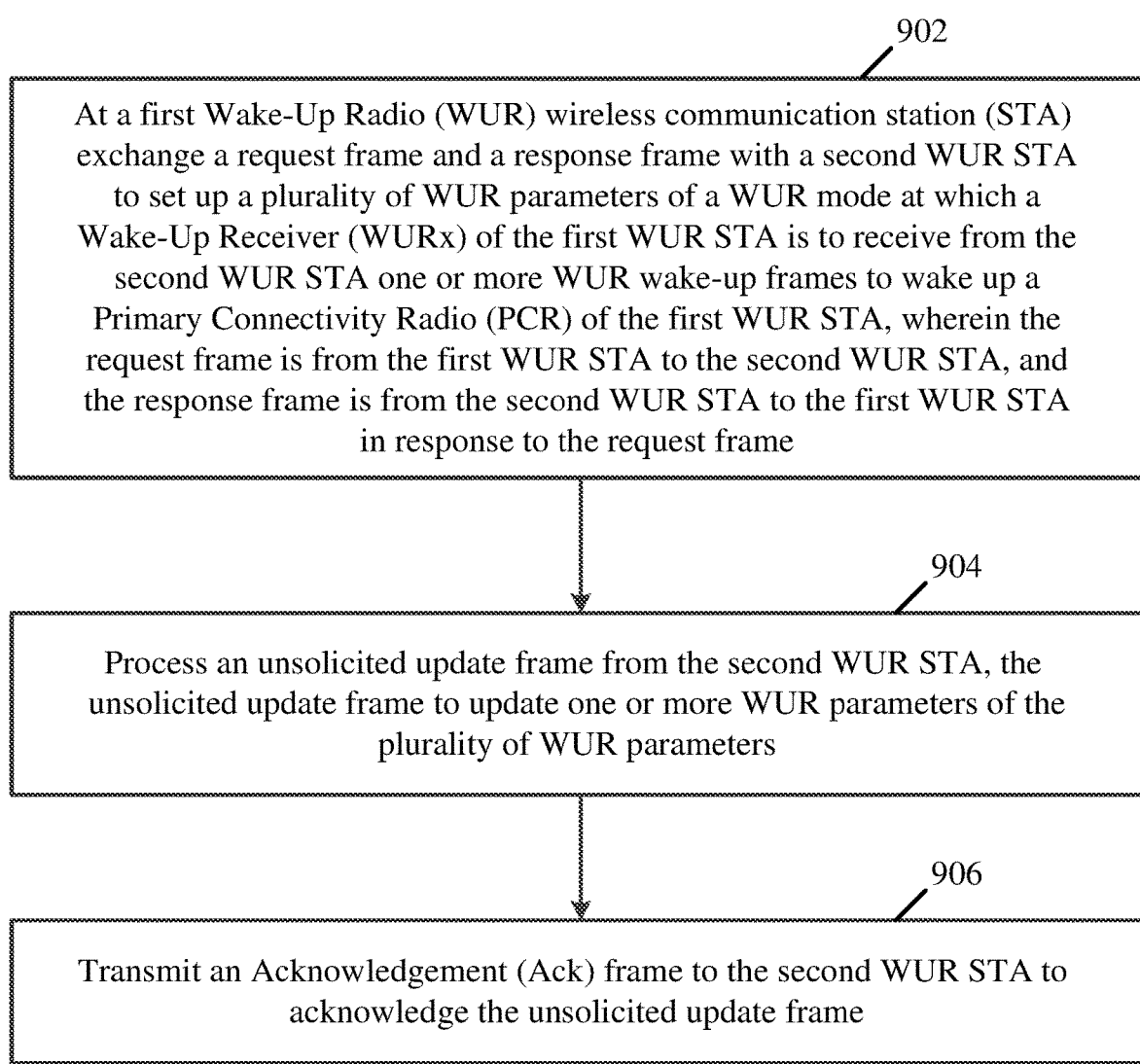
FIG. 9 is a schematic flow-chart illustration of a method of WUR, in accordance with some demonstrative embodiments.

Reference is made to FIG. 9, which schematically illustrates a method of WUR, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1) and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wake-up receiver, e.g., wake-up receiver 150 (FIG. 1); and/or a message processor, e.g., message processor 157 (FIG. 1), message processor 128 (FIG. 1) and/or message processor 158 (FIG. 1).

As indicated at block 902, the method may include exchanging at a first WUR STA a request frame and a response frame with a second WUR STA to set up a plurality of WUR parameters of a WUR mode at which a WURx of the first WUR STA is to receive from the second WUR STA one or more WUR wake-up frames to wake up a Primary Connectivity Radio (PCR) of the first WUR STA, wherein the request frame is from the second WUR STA to the first WUR STA, and the response frame is from the first WUR STA to the second WUR STA in response to the request frame. For example, controller 154 (FIG. 1) and/or controller 159 (FIG. 1) may control, cause and/or trigger device 140 (FIG. 1) to exchange the request frame and the response frame with device 102 (FIG. 1) to set up the plurality of WUR parameters of the WUR mode at which WURx 150 (FIG. 1) may receive from device 102 (FIG. 1) the one or more WUR wake-up frames to wake up radio 144 (FIG. 1), the request frame may be from device 140 (FIG. 1) to device 102 (FIG. 1), and the response frame may be from device 102 (FIG. 1) to device 140 (FIG. 1) in response to the request frame, e.g., as described above.

As indicated at block 904, the method may include processing an unsolicited update frame from the second WUR STA, the unsolicited update frame to update one or more WUR parameters of the plurality of WUR parameters. For example, controller 154 (FIG. 1) and/or controller 159 (FIG. 1) may control, cause and/or trigger device 140 (FIG. 1) to process the unsolicited update frame from device 102 (FIG. 1), the unsolicited update frame to update the one or more WUR parameters of the plurality of WUR parameters, e.g., as described above.

As indicated at block 906, the method may include transmitting an Acknowledgement (Ack) frame to the second WUR STA to acknowledge the unsolicited update frame to acknowledge the unsolicited update frame. For example, For example, controller 154 (FIG. 1) and/or controller 159 (FIG. 1) may control, cause and/or trigger device 140 (FIG. 1) to transmit the Ack frame to device 102 (FIG. 1) to acknowledge the unsolicited update frame, e.g., as described above.

Figure 10:
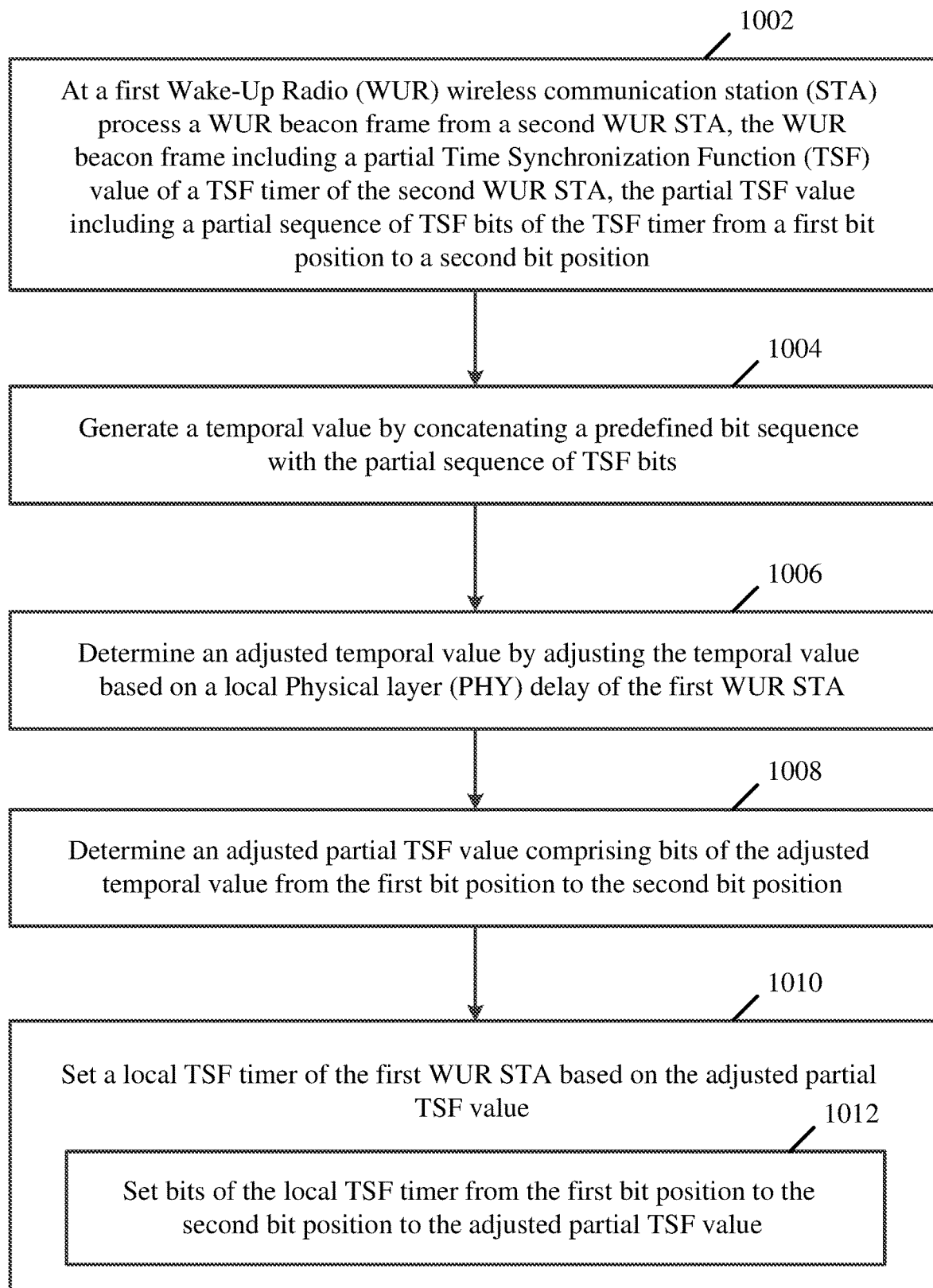
FIG. 10 is a schematic flow-chart illustration of a method of WUR, in accordance with some demonstrative embodiments.

Reference is made to FIG. 10, which schematically illustrates a method of WUR, in accordance with some demonstrative embodiments. For example, one or more of the operations of the method of FIG. 10 may be performed by one or more elements of a system, e.g., system 100 (FIG. 1), for example, one or more wireless devices, e.g., device 102 (FIG. 1) and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wake-up receiver, e.g., wake-up receiver 150 (FIG. 1); and/or a message processor, e.g., message processor 157 (FIG. 1), message processor 128 (FIG. 1) and/or message processor 158 (FIG. 1).

As indicated at block 1002, the method may include processing at a first WUR STA a WUR beacon frame from a second WUR STA, the WUR beacon frame including a partial TSF value of a TSF timer of the second WUR STA, the partial TSF value including a partial sequence of TSF bits of the TSF timer from a first bit position to a second bit position. For example, controller 154 (FIG. 1) and/or controller 159 (FIG. 1) may control, cause and/or trigger device 140 (FIG. 1) to process the WUR beacon frame from device 102 (FIG. 1), the WUR beacon frame including the partial TSF value of the TSF timer 115 (FIG. 1), the partial TSF value including the partial sequence of the TSF bits of the TSF timer 115 (FIG. 1) from the first bit position to the second bit position, e.g., as described above.

As indicated at block 1004, the method may include generating a temporal value by concatenating a predefined bit sequence with the partial sequence of TSF bits. For example, controller 154 (FIG. 1) and/or controller 159 (FIG. 1) may control, cause and/or trigger device 140 (FIG. 1) to generate the temporal value by concatenating the predefined bit sequence with the partial sequence of TSF bits, e.g., as described above.

As indicated at block 1006, the method may include determining an adjusted temporal value by adjusting the temporal value based on a local PHY delay of the first WUR STA. For example, controller 154 (FIG. 1) and/or controller 159 (FIG. 1) may control, cause and/or trigger device 140 (FIG. 1) to determine the adjusted temporal value by adjusting the temporal value based on the local PHY delay of device 140 (FIG. 1), e.g., as described above.

As indicated at block 1008, the method may include determining an adjusted partial TSF value including bits of the adjusted temporal value from the first bit position to the second bit position. For example, controller 154 (FIG. 1) and/or controller 159 (FIG. 1) may control, cause and/or trigger device 140 (FIG. 1) to determine the adjusted partial TSF value to include bits of the adjusted temporal value from the first bit position to the second bit position, e.g., as described above.

As indicated at block 1010, the method may include setting a local TSF timer of the first WUR STA based on the adjusted partial TSF value. For example, controller 154 (FIG. 1) and/or controller 159 (FIG. 1) may control, cause and/or trigger device 140 (FIG. 1) to set the local TSF timer 145 (FIG. 1) based on the adjusted partial TSF value, e.g., as described above.

As indicated at block 1012, setting the local TSF timer may include setting bits of the local TSF timer from the first bit position to the second bit position to the adjusted partial TSF value. For example, controller 154 (FIG. 1) and/or controller 159 (FIG. 1) may control, cause and/or trigger device 140 (FIG. 1) to set bits of the local TSF timer 145 (FIG. 1) from the first bit position to the second bit position to the adjusted partial TSF value, e.g., as described above.

Figure 11:
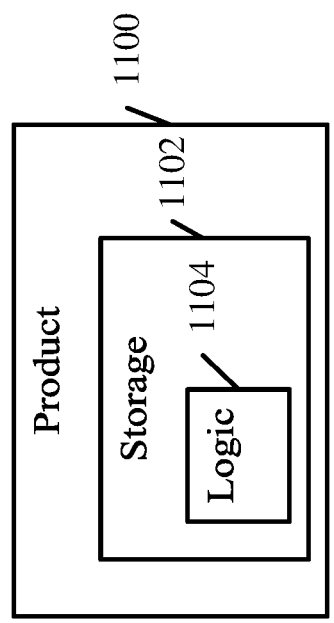
FIG. 11 is a schematic illustration of a product of manufacture, in accordance with some demonstrative embodiments.

Reference is made to FIG. 11, which schematically illustrates a product of manufacture 1100, in accordance with some demonstrative embodiments. Product 1100 may include one or more tangible computer-readable ("machine readable") non-transitory storage media 1102, which may include computer-executable instructions, e.g., implemented by logic 1104, operable to, when executed by at least one processor, e.g., computer processor, enable the at least one processor to implement one or more operations at device 102 (FIG. 1), device 140 (FIG. 1), radio 114 (FIG. 1), radio 144 (FIG. 1), wake-up receiver 150 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), controller 159 (FIG. 1), message processor 128 (FIG. 1), message processor 128 (FIG. 1), and/or message processor 157 (FIG. 1), to cause device 102 (FIG. 1), device 140 (FIG. 1), radio 114 (FIG. 1), radio 144 (FIG. 1), wake-up receiver 150 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), controller 159 (FIG. 1), message processor 128 (FIG. 1), message processor 158 (FIG. 1), and/or message processor 157 (FIG. 1) to perform one or more operations, and/or to perform, trigger and/or implement one or more operations, communications and/or functionalities described above with reference to FIGS. 1, 2, 3, 4, 5, 6, 7, 8, 9 and/or 10, and/or one or more operations described herein. The phrase "non-transitory machine-readable medium" is directed to include all computer-readable media, with the sole exception being a transitory propagating signal.

In some demonstrative embodiments, product 1100 and/or storage media 1102 may include one or more types of computer-readable storage media capable of storing data, including volatile memory, non-volatile memory, removable or non-removable memory, erasable or non-erasable memory, writeable or re-writeable memory, and the like. For example, storage media 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first Wake-Up Radio (WUR) wireless communication station (STA) to exchange a request frame and a response frame with a second WUR STA to set up a plurality of WUR parameters of a WUR mode at which the first WUR STA is to transmit one or more WUR wake-up frames configured for reception by a Wake-Up Receiver (WURx) of the second WUR STA, wherein the request frame is from the second WUR STA to the first WUR STA, and the response frame is from the first WUR STA to the second WUR STA in response to the request frame; transmit an unsolicited update frame to the second WUR STA to update one or more WUR parameters of the plurality of WUR parameters; and receive an Acknowledgement (Ack) frame from the second WUR STA to acknowledge the unsolicited update frame.

Example 2 includes the subject matter of Example 1, and optionally, wherein the unsolicited update frame comprises a WUR mode element comprising an action type field to indicate the update of the one or more WUR parameters.

Example 3 includes the subject matter of Example 1 or 2, and optionally, wherein the apparatus is configured to cause the first WUR STA to transmit the one or more WUR wake-up frames according to the one or more WUR parameters.

Example 4 includes the subject matter of any one of Examples 1-3, and optionally, wherein the apparatus is configured to cause the first WUR STA to exchange the request frame and the response frame with a Primary Connectivity Radio (PCR) of the second WUR STA, and to transmit the unsolicited update frame to the PCR of the second WUR.

Example 5 includes the subject matter of any one of Examples 1-4, and optionally, wherein the one or more WUR parameters comprise at least one of a WUR operating channel, a duty cycle operation parameter, or a WUR identifier to identify the WURx of the second WUR STA.

Example 6 includes the subject matter of any one of Examples 1-5, and optionally, wherein the unsolicited update frame comprises a countdown field to indicate a remaining time to update the one or more WUR parameters.

Example 7 includes the subject matter of Example 6, and optionally, wherein the countdown field is configured to indicate a count of remaining Target Beacon Transmission Time (TBTT) intervals to update the one or more WUR parameters.

Example 8 includes the subject matter of Example 6 or 7, and optionally, wherein the one or more WUR parameters comprise a WUR operating channel, the countdown field to indicate a remaining time to update the WUR operating channel.

Example 9 includes the subject matter of any one of Examples 1-8, and optionally, wherein the unsolicited update frame comprises a WUR operating channel switch element to indicate a WUR operating channel switch.

Example 10 includes the subject matter of any one of Examples 1-9, and optionally, wherein the unsolicited update frame comprises a WUR mode disable field configured to indicate that the WUR mode is to be disabled.

Example 11 includes the subject matter of any one of Examples 1-10, and optionally, wherein the unsolicited update frame is unsolicited by another request from the second WUR STA.

Example 12 includes the subject matter of any one of Examples 1-11, and optionally, wherein the apparatus is configured to cause the first WUR STA to process a message from the second WUR STA comprising an indication of a preferred data rate, and to transmit the one or more WUR wake-up frames according to the preferred data rate.

Example 13 includes the subject matter of any one of Examples 1-12, and optionally, wherein the first WUR STA comprises an Access-Point (AP) STA.

Example 14 includes the subject matter of any one of Examples 1-13, and optionally, comprising a radio, a memory, one or more antennas, and a processor.

Example 15 includes a system of wireless communication comprising a first Wake-Up Radio (WUR) wireless communication station (STA), the first WUR STA comprising a radio; a memory; a processor; one or more antennas; and a controller configured to cause the first WUR STA to exchange a request frame and a response frame with a second WUR STA to set up a plurality of WUR parameters of a WUR mode at which the first WUR STA is to transmit one or more WUR wake-up frames configured for reception by a Wake-Up Receiver (WURx) of the second WUR STA, wherein the request frame is from the second WUR STA to the first WUR STA, and the response frame is from the first WUR STA to the second WUR STA in response to the request frame; transmit an unsolicited update frame to the second WUR STA to update one or more WUR parameters of the plurality of WUR parameters; and receive an Acknowledgement (Ack) frame from the second WUR STA to acknowledge the unsolicited update frame.

Example 16 includes the subject matter of Example 15, and optionally, wherein the unsolicited update frame comprises a WUR mode element comprising an action type field to indicate the update of the one or more WUR parameters.

Example 17 includes the subject matter of Example 15 or 16, and optionally, wherein the controller is configured to cause the first WUR STA to transmit the one or more WUR wake-up frames according to the one or more WUR parameters.

Example 18 includes the subject matter of any one of Examples 15-17, and optionally, wherein the controller is configured to cause the first WUR STA to exchange the request frame and the response frame with a Primary Connectivity Radio (PCR) of the second WUR STA, and to transmit the unsolicited update frame to the PCR of the second WUR.

Example 19 includes the subject matter of any one of Examples 15-18, and optionally, wherein the one or more WUR parameters comprise at least one of a WUR operating channel, a duty cycle operation parameter, or a WUR identifier to identify the WURx of the second WUR STA.

Example 20 includes the subject matter of any one of Examples 15-19, and optionally, wherein the unsolicited update frame comprises a countdown field to indicate a remaining time to update the one or more WUR parameters.

Example 21 includes the subject matter of Example 20, and optionally, wherein the countdown field is configured to indicate a count of remaining Target Beacon Transmission Time (TBTT) intervals to update the one or more WUR parameters.

Example 22 includes the subject matter of Example 20 or 21, and optionally, wherein the one or more WUR parameters comprise a WUR operating channel, the countdown field to indicate a remaining time to update the WUR operating channel.

Example 23 includes the subject matter of any one of Examples 15-22, and optionally, wherein the unsolicited update frame comprises a WUR operating channel switch element to indicate a WUR operating channel switch.

Example 24 includes the subject matter of any one of Examples 15-23, and optionally, wherein the unsolicited update frame comprises a WUR mode disable field configured to indicate that the WUR mode is to be disabled.

Example 25 includes the subject matter of any one of Examples 15-24, and optionally, wherein the unsolicited update frame is unsolicited by another request from the second WUR STA.

Example 26 includes the subject matter of any one of Examples 15-25, and optionally, wherein the controller is configured to cause the first WUR STA to process a message from the second WUR STA comprising an indication of a preferred data rate, and to transmit the one or more WUR wake-up frames according to the preferred data rate.

Example 27 includes the subject matter of any one of Examples 15-26, and optionally, wherein the first WUR STA comprises an Access-Point (AP) STA.

Example 28 includes a method to be performed at a first Wake-Up Radio (WUR) wireless communication station (STA), the method comprising exchanging a request frame and a response frame with a second WUR STA to set up a plurality of WUR parameters of a WUR mode at which the first WUR STA is to transmit one or more WUR wake-up frames configured for reception by a Wake-Up Receiver (WURx) of the second WUR STA, wherein the request frame is from the second WUR STA to the first WUR STA, and the response frame is from the first WUR STA to the second WUR STA in response to the request frame; transmitting an unsolicited update frame to the second WUR STA to update one or more WUR parameters of the plurality of WUR parameters; and receiving an Acknowledgement (Ack) frame from the second WUR STA to acknowledge the unsolicited update frame.

Example 29 includes the subject matter of Example 28, and optionally, wherein the unsolicited update frame comprises a WUR mode element comprising an action type field to indicate the update of the one or more WUR parameters.

Example 30 includes the subject matter of Example 28 or 29, and optionally, comprising transmitting the one or more WUR wake-up frames according to the one or more WUR parameters.

Example 31 includes the subject matter of any one of Examples 28-30, and optionally, comprising exchanging the request frame and the response frame with a Primary Connectivity Radio (PCR) of the second WUR STA, and transmitting the unsolicited update frame to the PCR of the second WUR.

Example 32 includes the subject matter of any one of Examples 28-31, and optionally, wherein the one or more WUR parameters comprise at least one of a WUR operating channel, a duty cycle operation parameter, or a WUR identifier to identify the WURx of the second WUR STA.

Example 33 includes the subject matter of any one of Examples 28-32, and optionally, wherein the unsolicited update frame comprises a countdown field to indicate a remaining time to update the one or more WUR parameters.

Example 34 includes the subject matter of Example 33, and optionally, wherein the countdown field is configured to indicate a count of remaining Target Beacon Transmission Time (TBTT) intervals to update the one or more WUR parameters.

Example 35 includes the subject matter of Example 33 or 34, and optionally, wherein the one or more WUR parameters comprise a WUR operating channel, the countdown field to indicate a remaining time to update the WUR operating channel.

Example 36 includes the subject matter of any one of Examples 28-35, and optionally, wherein the unsolicited update frame comprises a WUR operating channel switch element to indicate a WUR operating channel switch.

Example 37 includes the subject matter of any one of Examples 28-36, and optionally, wherein the unsolicited update frame comprises a WUR mode disable field configured to indicate that the WUR mode is to be disabled.

Example 38 includes the subject matter of any one of Examples 28-37, and optionally, wherein the unsolicited update frame is unsolicited by another request from the second WUR STA.

Example 39 includes the subject matter of any one of Examples 28-38, and optionally, comprising processing a message from the second WUR STA comprising an indication of a preferred data rate, and transmitting the one or more WUR wake-up frames according to the preferred data rate.

Example 40 includes the subject matter of any one of Examples 28-39, and optionally, wherein the first WUR STA comprises an Access-Point (AP) STA.

Example 41 includes a product comprising one or more tangible computer-readable non-transitory storage media comprising computer-executable instructions operable to, when executed by at least one processor, enable the at least one processor to cause a first Wake-Up Radio (WUR) wireless communication station (STA) to exchange a request frame and a response frame with a second WUR STA to set up a plurality of WUR parameters of a WUR mode at which the first WUR STA is to transmit one or more WUR wake-up frames configured for reception by a Wake-Up Receiver (WURx) of the second WUR STA, wherein the request frame is from the second WUR STA to the first WUR STA, and the response frame is from the first WUR STA to the second WUR STA in response to the request frame; transmit an unsolicited update frame to the second WUR STA to update one or more WUR parameters of the plurality of WUR parameters; and receive an Acknowledgement (Ack) frame from the second WUR STA to acknowledge the unsolicited update frame.

Example 42 includes the subject matter of Example 41, and optionally, wherein the unsolicited update frame comprises a WUR mode element comprising an action type field to indicate the update of the one or more WUR parameters.

Example 43 includes the subject matter of Example 41 or 42, and optionally, wherein the instructions, when executed, cause the first WUR STA to transmit the one or more WUR wake-up frames according to the one or more WUR parameters.

Example 44 includes the subject matter of any one of Examples 41-43, and optionally, wherein the instructions, when executed, cause the first WUR STA to exchange the request frame and the response frame with a Primary Connectivity Radio (PCR) of the second WUR STA, and to transmit the unsolicited update frame to the PCR of the second WUR.

Example 45 includes the subject matter of any one of Examples 41-44, and optionally, wherein the one or more WUR parameters comprise at least one of a WUR operating channel, a duty cycle operation parameter, or a WUR identifier to identify the WURx of the second WUR STA.

Example 46 includes the subject matter of any one of Examples 41-45, and optionally, wherein the unsolicited update frame comprises a countdown field to indicate a remaining time to update the one or more WUR parameters.

Example 47 includes the subject matter of Example 46, and optionally, wherein the countdown field is configured to indicate a count of remaining Target Beacon Transmission Time (TBTT) intervals to update the one or more WUR parameters.

Example 48 includes the subject matter of Example 46 or 47, and optionally, wherein the one or more WUR parameters comprise a WUR operating channel, the countdown field to indicate a remaining time to update the WUR operating channel.

Example 49 includes the subject matter of any one of Examples 41-48, and optionally, wherein the unsolicited update frame comprises a WUR operating channel switch element to indicate a WUR operating channel switch.

Example 50 includes the subject matter of any one of Examples 41-49, and optionally, wherein the unsolicited update frame comprises a WUR mode disable field configured to indicate that the WUR mode is to be disabled.

Example 51 includes the subject matter of any one of Examples 41-50, and optionally, wherein the unsolicited update frame is unsolicited by another request from the second WUR STA.

Example 52 includes the subject matter of any one of Examples 41-51, and optionally, wherein the instructions, when executed, cause the first WUR STA to process a message from the second WUR STA comprising an indication of a preferred data rate, and to transmit the one or more WUR wake-up frames according to the preferred data rate.

Example 53 includes the subject matter of any one of Examples 41-52, and optionally, wherein the first WUR STA comprises an Access-Point (AP) STA.

Example 54 includes an apparatus of wireless communication by a first Wake-Up Radio (WUR) wireless communication station (STA), the apparatus comprising means for exchanging a request frame and a response frame with a second WUR STA to set up a plurality of WUR parameters of a WUR mode at which the first WUR STA is to transmit one or more WUR wake-up frames configured for reception by a Wake-Up Receiver (WURx) of the second WUR STA, wherein the request frame is from the second WUR STA to the first WUR STA, and the response frame is from the first WUR STA to the second WUR STA in response to the request frame; means for transmitting an unsolicited update frame to the second WUR STA to update one or more WUR parameters of the plurality of WUR parameters; and means for receiving an Acknowledgement (Ack) frame from the second WUR STA to acknowledge the unsolicited update frame.

Example 55 includes the subject matter of Example 54, and optionally, wherein the unsolicited update frame comprises a WUR mode element comprising an action type field to indicate the update of the one or more WUR parameters.

Example 56 includes the subject matter of Example 54 or 55, and optionally, comprising means for transmitting the one or more WUR wake-up frames according to the one or more WUR parameters.

Example 57 includes the subject matter of any one of Examples 54-56, and optionally, comprising means for exchanging the request frame and the response frame with a Primary Connectivity Radio (PCR) of the second WUR STA, and transmitting the unsolicited update frame to the PCR of the second WUR.

Example 58 includes the subject matter of any one of Examples 54-57, and optionally, wherein the one or more WUR parameters comprise at least one of a WUR operating channel, a duty cycle operation parameter, or a WUR identifier to identify the WURx of the second WUR STA.

Example 59 includes the subject matter of any one of Examples 54-58, and optionally, wherein the unsolicited update frame comprises a countdown field to indicate a remaining time to update the one or more WUR parameters.

Example 60 includes the subject matter of Example 59, and optionally, wherein the countdown field is configured to indicate a count of remaining Target Beacon Transmission Time (TBTT) intervals to update the one or more WUR parameters.

Example 61 includes the subject matter of Example 59 or 60, and optionally, wherein the one or more WUR parameters comprise a WUR operating channel, the countdown field to indicate a remaining time to update the WUR operating channel.

Example 62 includes the subject matter of any one of Examples 54-61, and optionally, wherein the unsolicited update frame comprises a WUR operating channel switch element to indicate a WUR operating channel switch.

Example 63 includes the subject matter of any one of Examples 54-62, and optionally, wherein the unsolicited update frame comprises a WUR mode disable field configured to indicate that the WUR mode is to be disabled.

Example 64 includes the subject matter of any one of Examples 54-63, and optionally, wherein the unsolicited update frame is unsolicited by another request from the second WUR STA.

Example 65 includes the subject matter of any one of Examples 54-64, and optionally, comprising means for processing a message from the second WUR STA comprising an indication of a preferred data rate, and transmitting the one or more WUR wake-up frames according to the preferred data rate.

Example 66 includes the subject matter of any one of Examples 54-65, and optionally, wherein the first WUR STA comprises an Access-Point (AP) STA.

Example 67 includes an apparatus comprising logic and circuitry configured to cause a first Wake-Up Radio (WUR) wireless communication station (STA) to exchange a request frame and a response frame with a second WUR STA to set up a plurality of WUR parameters of a WUR mode at which a Wake-Up Receiver (WURx) of the first WUR STA is to receive from the second WUR STA one or more WUR wake-up frames to wake up a Primary Connectivity Radio (PCR) of the first WUR STA, wherein the request frame is from the first WUR STA to the second WUR STA, and the response frame is from the second WUR STA to the first WUR STA in response to the request frame; process an unsolicited update frame from the second WUR STA, the unsolicited update frame to update one or more WUR parameters of the plurality of WUR parameters; and transmit an Acknowledgement (Ack) frame to the second WUR STA to acknowledge the unsolicited update frame.

Example 68 includes the subject matter of Example 67, and optionally, wherein the unsolicited update frame comprises a WUR mode element comprising an action type field to indicate the update of the one or more WUR parameters.

Example 69 includes the subject matter of Example 67 or 68, and optionally, wherein the apparatus is configured to cause the first WUR STA to update the one or more WUR parameters based on the unsolicited update frame.

Example 70 includes the subject matter of any one of Examples 67-69, and optionally, wherein the apparatus is configured to cause the first WUR STA to receive the one or more WUR wake-up frames based on the one or more WUR parameters.

Example 71 includes the subject matter of any one of Examples 67-70, and optionally, wherein the one or more WUR parameters comprise at least one of a WUR operating channel, a duty cycle operation parameter, or a WUR identifier to identify the WURx of the first WUR STA.

Example 72 includes the subject matter of any one of Examples 67-71, and optionally, wherein the apparatus is configured to cause the first WUR STA to determine a remaining time to update the one or more WUR parameters based on a countdown field in the unsolicited update frame, and to update the one or more WUR parameters based on the remaining time.

Example 73 includes the subject matter of Example 72, and optionally, wherein the apparatus is configured to cause the first WUR STA to determine a number of remaining Target Beacon Transmission Time (TBTT) intervals to update the one or more WUR parameters based on the countdown field in the unsolicited update frame.

Example 74 includes the subject matter of Example 72 or 73, and optionally, wherein the apparatus is configured to cause the first WUR STA to update a WUR operating channel based on the remaining time.

Example 75 includes the subject matter of any one of Examples 67-74, and optionally, wherein the unsolicited update frame comprises a WUR operating channel switch element to indicate a WUR operating channel switch.

Example 76 includes the subject matter of any one of Examples 67-75, and optionally, wherein the apparatus is configured to cause the first WUR STA to disable the WUR mode based on a WUR mode disable field in the unsolicited update frame.

Example 77 includes the subject matter of any one of Examples 67-76, and optionally, wherein the unsolicited update frame is unsolicited by another request from the second WUR STA.

Example 78 includes the subject matter of any one of Examples 67-77, and optionally, wherein the apparatus is configured to cause the first WUR STA to transmit to the second WUR STA a message comprising an indication of a preferred data rate, and to process the one or more WUR wake-up frames according to the preferred data rate.

Example 79 includes the subject matter of any one of Examples 67-78, and optionally, wherein the first WUR STA comprises a non Access-Point (AP) (non-AP) STA.

Example 80 includes the subject matter of any one of Examples 67-79, and optionally, comprising the PCR, and the WURx.

Example 81 includes the subject matter of any one of Examples 67-80, and optionally, comprising one or more antennas, a memory, and a processor.

Example 82 includes a system of wireless communication comprising a first Wake-Up Radio (WUR) wireless communication station (STA), the first WUR STA comprising a memory; a processor; one or more antennas; and a controller configured to cause the first WUR STA to exchange a request frame and a response frame with a second WUR STA to set up a plurality of WUR parameters of a WUR mode at which a Wake-Up Receiver (WURx) of the first WUR STA is to receive from the second WUR STA one or more WUR wake-up frames to wake up a Primary Connectivity Radio (PCR) of the first WUR STA, wherein the request frame is from the first WUR STA to the second WUR STA, and the response frame is from the second WUR STA to the first WUR STA in response to the request frame; process an unsolicited update frame from the second WUR STA, the unsolicited update frame to update one or more WUR parameters of the plurality of WUR parameters; and transmit an Acknowledgement (Ack) frame to the second WUR STA to acknowledge the unsolicited update frame.

Example 83 includes the subject matter of Example 82, and optionally, wherein the unsolicited update frame comprises a WUR mode element comprising an action type field to indicate the update of the one or more WUR parameters.

Example 84 includes the subject matter of Example 82 or 83, and optionally, wherein the controller is configured to cause the first WUR STA to update the one or more WUR parameters based on the unsolicited update frame.

Example 85 includes the subject matter of any one of Examples 82-84, and optionally, wherein the controller is configured to cause the first WUR STA to receive the one or more WUR wake-up frames based on the one or more WUR parameters.

Example 86 includes the subject matter of any one of Examples 82-85, and optionally, wherein the one or more WUR parameters comprise at least one of a WUR operating channel, a duty cycle operation parameter, or a WUR identifier to identify the WURx of the first WUR STA.

Example 87 includes the subject matter of any one of Examples 82-86, and optionally, wherein the controller is configured to cause the first WUR STA to determine a remaining time to update the one or more WUR parameters based on a countdown field in the unsolicited update frame, and to update the one or more WUR parameters based on the remaining time.

Example 88 includes the subject matter of Example 87, and optionally, wherein the controller is configured to cause the first WUR STA to determine a number of remaining Target Beacon Transmission Time (TBTT) intervals to update the one or more WUR parameters based on the countdown field in the unsolicited update frame.

Example 89 includes the subject matter of Example 87 or 88, and optionally, wherein the controller is configured to cause the first WUR STA to update a WUR operating channel based on the remaining time.

Example 90 includes the subject matter of any one of Examples 82-89, and optionally, wherein the unsolicited update frame comprises a WUR operating channel switch element to indicate a WUR operating channel switch.

Example 91 includes the subject matter of any one of Examples 82-90, and optionally, wherein the controller is configured to cause the first WUR STA to disable the WUR mode based on a WUR mode disable field in the unsolicited update frame.

Example 92 includes the subject matter of any one of Examples 82-91, and optionally, wherein the unsolicited update frame is unsolicited by another request from the second WUR STA.

Example 93 includes the subject matter of any one of Examples 82-92, and optionally, wherein the controller is configured to cause the first WUR STA to transmit to the second WUR STA a message comprising an indication of a preferred data rate, and to process the one or more WUR wake-up frames according to the preferred data rate.

Example 94 includes the subject matter of any one of Examples 82-93, and optionally, wherein the first WUR STA comprises a non Access-Point (AP) (non-AP) STA.

Example 95 includes the subject matter of any one of Examples 82-94, and optionally, wherein the first WUR STA comprises the PCR, and the WURx.

Example 96 includes a method to be performed at a first Wake-Up Radio (WUR) wireless communication station (STA), the method comprising exchanging a request frame and a response frame with a second WUR STA to set up a plurality of WUR parameters of a WUR mode at which a Wake-Up Receiver (WURx) of the first WUR STA is to receive from the second WUR STA one or more WUR wake-up frames to wake up a Primary Connectivity Radio (PCR) of the first WUR STA, wherein the request frame is from the first WUR STA to the second WUR STA, and the response frame is from the second WUR STA to the first WUR STA in response to the request frame; processing an unsolicited update frame from the second WUR STA, the unsolicited update frame to update one or more WUR parameters of the plurality of WUR parameters; and transmitting an Acknowledgement (Ack) frame to the second WUR STA to acknowledge the unsolicited update frame.

Example 97 includes the subject matter of Example 96, and optionally, wherein the unsolicited update frame comprises a WUR mode element comprising an action type field to indicate the update of the one or more WUR parameters.

Example 98 includes the subject matter of Example 96 or 97, and optionally, comprising updating the one or more WUR parameters based on the unsolicited update frame.

Example 99 includes the subject matter of any one of Examples 96-98, and optionally, comprising receiving the one or more WUR wake-up frames based on the one or more WUR parameters.

Example 100 includes the subject matter of any one of Examples 96-99, and optionally, wherein the one or more WUR parameters comprise at least one of a WUR operating channel, a duty cycle operation parameter, or a WUR identifier to identify the WURx of the first WUR STA.

Example 101 includes the subject matter of any one of Examples 96-100, and optionally, comprising determining a remaining time to update the one or more WUR parameters based on a countdown field in the unsolicited update frame, and updating the one or more WUR parameters based on the remaining time.

Example 102 includes the subject matter of Example 101, and optionally, comprising determining a number of remaining Target Beacon Transmission Time (TBTT) intervals to update the one or more WUR parameters based on the countdown field in the unsolicited update frame.

Example 103 includes the subject matter of Example 101 or 102, and optionally, comprising updating a WUR operating channel based on the remaining time.

Example 104 includes the subject matter of any one of Examples 96-103, and optionally, wherein the unsolicited update frame comprises a WUR operating channel switch element to indicate a WUR operating channel switch.

Example 105 includes the subject matter of any one of Examples 96-104, and optionally, comprising disabling the WUR mode based on a WUR mode disable field in the unsolicited update frame.

Example 106 includes the subject matter of any one of Examples 96-105, and optionally, wherein the unsolicited update frame is unsolicited by another request from the second WUR STA.

Example 107 includes the subject matter of any one of Examples 96-106, and optionally, comprising transmitting to the second WUR STA a message comprising an indication of a preferred data rate, and processing the one or more WUR wake-up frames according to the preferred data rate.

Example 108 includes the subject matter of any one of Examples 96-107, and optionally, wherein the first WUR STA comprises a non Access-Point (AP) (non-AP) STA.

Example 109 includes the subject matter of any one of Examples 96-108, and optionally, wherein the first WUR STA comprises the PCR, and the WURx.

Example 110 includes a product comprising one or more tangible computer-readable non-transitory storage media comprising computer-executable instructions operable to, when executed by at least one processor, enable the at least one processor to cause a first Wake-Up Radio (WUR) wireless communication station (STA) to exchange a request frame and a response frame with a second WUR STA to set up a plurality of WUR parameters of a WUR mode at which a Wake-Up Receiver (WURx) of the first WUR STA is to receive from the second WUR STA one or more WUR wake-up frames to wake up a Primary Connectivity Radio (PCR) of the first WUR STA, wherein the request frame is from the first WUR STA to the second WUR STA, and the response frame is from the second WUR STA to the first WUR STA in response to the request frame; process an unsolicited update frame from the second WUR STA, the unsolicited update frame to update one or more WUR parameters of the plurality of WUR parameters; and transmit an Acknowledgement (Ack) frame to the second WUR STA to acknowledge the unsolicited update frame.

Example 111 includes the subject matter of Example 110, and optionally, wherein the unsolicited update frame comprises a WUR mode element comprising an action type field to indicate the update of the one or more WUR parameters.

Example 112 includes the subject matter of Example 110 or 111, and optionally, wherein the instructions, when executed, cause the first WUR STA to update the one or more WUR parameters based on the unsolicited update frame.

Example 113 includes the subject matter of any one of Examples 110-112, and optionally, wherein the instructions, when executed, cause the first WUR STA to receive the one or more WUR wake-up frames based on the one or more WUR parameters.

Example 114 includes the subject matter of any one of Examples 110-113, and optionally, wherein the one or more WUR parameters comprise at least one of a WUR operating channel, a duty cycle operation parameter, or a WUR identifier to identify the WURx of the first WUR STA.

Example 115 includes the subject matter of any one of Examples 110-114, and optionally, wherein the instructions, when executed, cause the first WUR STA to determine a remaining time to update the one or more WUR parameters based on a countdown field in the unsolicited update frame, and to update the one or more WUR parameters based on the remaining time.

Example 116 includes the subject matter of Example 115, and optionally, wherein the instructions, when executed, cause the first WUR STA to determine a number of remaining Target Beacon Transmission Time (TBTT) intervals to update the one or more WUR parameters based on the countdown field in the unsolicited update frame.

Example 117 includes the subject matter of Example 115 or 116, and optionally, wherein the instructions, when executed, cause the first WUR STA to update a WUR operating channel based on the remaining time.

Example 118 includes the subject matter of any one of Examples 110-117, and optionally, wherein the unsolicited update frame comprises a WUR operating channel switch element to indicate a WUR operating channel switch.

Example 119 includes the subject matter of any one of Examples 110-118, and optionally, wherein the instructions, when executed, cause the first WUR STA to disable the WUR mode based on a WUR mode disable field in the unsolicited update frame.

Example 120 includes the subject matter of any one of Examples 110-119, and optionally, wherein the unsolicited update frame is unsolicited by another request from the second WUR STA.

Example 121 includes the subject matter of any one of Examples 110-120, and optionally, wherein the instructions, when executed, cause the first WUR STA to transmit to the second WUR STA a message comprising an indication of a preferred data rate, and to process the one or more WUR wake-up frames according to the preferred data rate.

Example 122 includes the subject matter of any one of Examples 110-121, and optionally, wherein the first WUR STA comprises a non Access-Point (AP) (non-AP) STA.

Example 123 includes the subject matter of any one of Examples 110-122, and optionally, wherein the first WUR STA comprises the PCR, and the WURx.

Example 124 includes an apparatus of wireless communication by a first Wake-Up Radio (WUR) wireless communication station (STA), the apparatus comprising means for exchanging a request frame and a response frame with a second WUR STA to set up a plurality of WUR parameters of a WUR mode at which a Wake-Up Receiver (WURx) of the first WUR STA is to receive from the second WUR STA one or more WUR wake-up frames to wake up a Primary Connectivity Radio (PCR) of the first WUR STA, wherein the request frame is from the first WUR STA to the second WUR STA, and the response frame is from the second WUR STA to the first WUR STA in response to the request frame; means for processing an unsolicited update frame from the second WUR STA, the unsolicited update frame to update one or more WUR parameters of the plurality of WUR parameters; and means for transmitting an Acknowledgement (Ack) frame to the second WUR STA to acknowledge the unsolicited update frame.

Example 125 includes the subject matter of Example 124, and optionally, wherein the unsolicited update frame comprises a WUR mode element comprising an action type field to indicate the update of the one or more WUR parameters.

Example 126 includes the subject matter of Example 124 or 125, and optionally, comprising means for updating the one or more WUR parameters based on the unsolicited update frame.

Example 127 includes the subject matter of any one of Examples 124-126, and optionally, comprising means for receiving the one or more WUR wake-up frames based on the one or more WUR parameters.

Example 128 includes the subject matter of any one of Examples 124-127, and optionally, wherein the one or more WUR parameters comprise at least one of a WUR operating channel, a duty cycle operation parameter, or a WUR identifier to identify the WURx of the first WUR STA.

Example 129 includes the subject matter of any one of Examples 124-128, and optionally, comprising means for determining a remaining time to update the one or more WUR parameters based on a countdown field in the unsolicited update frame, and updating the one or more WUR parameters based on the remaining time.

Example 130 includes the subject matter of Example 129, and optionally, comprising means for determining a number of remaining Target Beacon Transmission Time (TBTT) intervals to update the one or more WUR parameters based on the countdown field in the unsolicited update frame.

Example 131 includes the subject matter of Example 129 or 130, and optionally, comprising means for updating a WUR operating channel based on the remaining time.

Example 132 includes the subject matter of any one of Examples 124-131, and optionally, wherein the unsolicited update frame comprises a WUR operating channel switch element to indicate a WUR operating channel switch.

Example 133 includes the subject matter of any one of Examples 124-132, and optionally, comprising means for disabling the WUR mode based on a WUR mode disable field in the unsolicited update frame.

Example 134 includes the subject matter of any one of Examples 124-133, and optionally, wherein the unsolicited update frame is unsolicited by another request from the second WUR STA.

Example 135 includes the subject matter of any one of Examples 124-134, and optionally, comprising means for transmitting to the second WUR STA a message comprising an indication of a preferred data rate, and processing the one or more WUR wake-up frames according to the preferred data rate.

Example 136 includes the subject matter of any one of Examples 124-135, and optionally, wherein the first WUR STA comprises a non Access-Point (AP) (non-AP) STA.

Example 137 includes the subject matter of any one of Examples 124-136, and optionally, wherein the first WUR STA comprises the PCR, and the WURx.

Example 138 includes an apparatus comprising logic an circuitry configured to cause a first Wake-Up Radio (WUR) wireless communication station (STA) to process a WUR beacon frame from a second WUR STA, the WUR beacon frame comprising a partial Time Synchronization Function (TSF) value of a TSF timer of the second WUR STA, the partial TSF value comprising a partial sequence of TSF bits of the TSF timer from a first bit position to a second bit position; generate a temporal value by concatenating a predefined bit sequence with the partial sequence of TSF bits; determine an adjusted temporal value by adjusting the temporal value based on a local Physical layer (PHY) delay of the first WUR STA; determine an adjusted partial TSF value comprising bits of the adjusted temporal value from the first bit position to the second bit position; and set a local TSF timer of the first WUR STA based on the adjusted partial TSF value by setting bits of the local TSF timer from the first bit position to the second bit position to the adjusted partial TSF value.

Example 139 includes the subject matter of Example 138, and optionally, wherein the predefined bit sequence represents assumed bits from a bit position zero to a bit position, which is immediately before the first bit position.

Example 140 includes the subject matter of Example 138 or 139, and optionally, wherein a count of bits in the predefined bit sequence is equal to a count of bits from a zero bit position to a bit position, which is immediately before the first bit position.

Example 141 includes the subject matter of any one of Examples 138-140, and optionally, wherein the predefined bit sequence comprises an implementation specific value.

Example 142 includes the subject matter of any one of Examples 138-141, and optionally, wherein the apparatus is configured to cause the first WUR STA to determine the adjusted temporal value by adding to the temporal value a sum of the local PHY delay of the first WUR STA and a time since reception of a first bit of the partial TSF value at a Media Access Control (MAC)/PHY interface of the first WUR STA.

Example 143 includes the subject matter of any one of Examples 138-142, and optionally, wherein the apparatus is configured to cause the first WUR STA to adjust a sequence of Most Significant bits (MSBs) of the local TSF timer from a bit position immediately after the second bit position based on a comparison between an MSB of the adjusted partial TSF value and a bit of the local TSF timer at the second bit position.

Example 144 includes the subject matter of Example 143, and optionally, wherein the apparatus is configured to cause the first WUR STA to adjust the sequence of MSBs of the local TSF timer, when the MSB of the adjusted partial TSF value is not equal to the bit of the local TSF timer at the second bit position.

Example 145 includes the subject matter of any one of Examples 138-144, and optionally, wherein the apparatus is configured to cause the first WUR STA to determine a duty cycle of a Wake-Up Receiver (WURx) of the first WUR STA based on the local TSF timer.

Example 146 includes the subject matter of any one of Examples 138-145, and optionally, wherein the first WUR STA comprises a non Access-Point (AP) (non-AP) STA.

Example 147 includes the subject matter of any one of Examples 138-146, and optionally, comprising a Wake-Up Receiver (WURx) to receive the WUR beacon frame.

Example 148 includes the subject matter of any one of Examples 138-147, and optionally, comprising a radio, one or more antennas, a memory, and a processor.

Example 149 includes a system of wireless communication comprising a first Wake-Up Radio (WUR) wireless communication station (STA), the first WUR STA comprising a radio; a memory; a processor; one or more antennas; and a controller configured to cause the first WUR STA to process a WUR beacon frame from a second WUR STA, the WUR beacon frame comprising a partial Time Synchronization Function (TSF) value of a TSF timer of the second WUR STA, the partial TSF value comprising a partial sequence of TSF bits of the TSF timer from a first bit position to a second bit position; generate a temporal value by concatenating a predefined bit sequence with the partial sequence of TSF bits; determine an adjusted temporal value by adjusting the temporal value based on a local Physical layer (PHY) delay of the first WUR STA; determine an adjusted partial TSF value comprising bits of the adjusted temporal value from the first bit position to the second bit position; and set a local TSF timer of the first WUR STA based on the adjusted partial TSF value by setting bits of the local TSF timer from the first bit position to the second bit position to the adjusted partial TSF value.

Example 150 includes the subject matter of Example 149, and optionally, wherein the predefined bit sequence represents assumed bits from a bit position zero to a bit position, which is immediately before the first bit position.

Example 151 includes the subject matter of Example 149 or 150, and optionally, wherein a count of bits in the predefined bit sequence is equal to a count of bits from a zero bit position to a bit position, which is immediately before the first bit position.

Example 152 includes the subject matter of any one of Examples 149-151, and optionally, wherein the predefined bit sequence comprises an implementation specific value.

Example 153 includes the subject matter of any one of Examples 149-152, and optionally, wherein the controller is configured to cause the first WUR STA to determine the adjusted temporal value by adding to the temporal value a sum of the local PHY delay of the first WUR STA and a time since reception of a first bit of the partial TSF value at a Media Access Control (MAC)/PHY interface of the first WUR STA.

Example 154 includes the subject matter of any one of Examples 149-153, and optionally, wherein the controller is configured to cause the first WUR STA to adjust a sequence of Most Significant bits (MSBs) of the local TSF timer from a bit position immediately after the second bit position based on a comparison between an MSB of the adjusted partial TSF value and a bit of the local TSF timer at the second bit position.

Example 155 includes the subject matter of Example 154, and optionally, wherein the controller is configured to cause the first WUR STA to adjust the sequence of MSBs of the local TSF timer, when the MSB of the adjusted partial TSF value is not equal to the bit of the local TSF timer at the second bit position.

Example 156 includes the subject matter of any one of Examples 149-155, and optionally, wherein the controller is configured to cause the first WUR STA to determine a duty cycle of a Wake-Up Receiver (WURx) of the first WUR STA based on the local TSF timer.

Example 157 includes the subject matter of any one of Examples 149-156, and optionally, wherein the first WUR STA comprises a non Access-Point (AP) (non-AP) STA.

Example 158 includes the subject matter of any one of Examples 149-157, and optionally, wherein the first WUR STA comprises a Wake-Up Receiver (WURx) to receive the WUR beacon frame.

Example 159 includes a method to be performed at a first Wake-Up Radio (WUR) wireless communication station (STA), the method comprising processing a WUR beacon frame from a second WUR STA, the WUR beacon frame comprising a partial Time Synchronization Function (TSF) value of a TSF timer of the second WUR STA, the partial TSF value comprising a partial sequence of TSF bits of the TSF timer from a first bit position to a second bit position; generating a temporal value by concatenating a predefined bit sequence with the partial sequence of TSF bits; determining an adjusted temporal value by adjusting the temporal value based on a local Physical layer (PHY) delay of the first WUR STA; determining an adjusted partial TSF value comprising bits of the adjusted temporal value from the first bit position to the second bit position; and setting a local TSF timer of the first WUR STA based on the adjusted partial TSF value by setting bits of the local TSF timer from the first bit position to the second bit position to the adjusted partial TSF value.

Example 160 includes the subject matter of Example 159, and optionally, wherein the predefined bit sequence represents assumed bits from a bit position zero to a bit position, which is immediately before the first bit position.

Example 161 includes the subject matter of Example 159 or 160, and optionally, wherein a count of bits in the predefined bit sequence is equal to a count of bits from a zero bit position to a bit position, which is immediately before the first bit position.

Example 162 includes the subject matter of any one of Examples 159-161, and optionally, wherein the predefined bit sequence comprises an implementation specific value.

Example 163 includes the subject matter of any one of Examples 159-162, and optionally, comprising determining the adjusted temporal value by adding to the temporal value a sum of the local PHY delay of the first WUR STA and a time since reception of a first bit of the partial TSF value at a Media Access Control (MAC)/PHY interface of the first WUR STA.

Example 164 includes the subject matter of any one of Examples 159-163, and optionally, comprising adjusting a sequence of Most Significant bits (MSBs) of the local TSF timer from a bit position immediately after the second bit position based on a comparison between an MSB of the adjusted partial TSF value and a bit of the local TSF timer at the second bit position.

Example 165 includes the subject matter of Example 164, and optionally, comprising adjusting the sequence of MSBs of the local TSF timer, when the MSB of the adjusted partial TSF value is not equal to the bit of the local TSF timer at the second bit position.

Example 166 includes the subject matter of any one of Examples 159-165, and optionally, comprising determining a duty cycle of a Wake-Up Receiver (WURx) of the first WUR STA based on the local TSF timer.

Example 167 includes the subject matter of any one of Examples 159-166, and optionally, wherein the first WUR STA comprises a non Access-Point (AP) (non-AP) STA.

Example 168 includes a product comprising one or more tangible computer-readable non-transitory storage media comprising computer-executable instructions operable to, when executed by at least one processor, enable the at least one processor to cause a first Wake-Up Radio (WUR) wireless communication station (STA) to process a WUR beacon frame from a second WUR STA, the WUR beacon frame comprising a partial Time Synchronization Function (TSF) value of a TSF timer of the second WUR STA, the partial TSF value comprising a partial sequence of TSF bits of the TSF timer from a first bit position to a second bit position; generate a temporal value by concatenating a predefined bit sequence with the partial sequence of TSF bits; determine an adjusted temporal value by adjusting the temporal value based on a local Physical layer (PHY) delay of the first WUR STA; determine an adjusted partial TSF value comprising bits of the adjusted temporal value from the first bit position to the second bit position; and set a local TSF timer of the first WUR STA based on the adjusted partial TSF value by setting bits of the local TSF timer from the first bit position to the second bit position to the adjusted partial TSF value.

Example 169 includes the subject matter of Example 168, and optionally, wherein the predefined bit sequence represents assumed bits from a bit position zero to a bit position, which is immediately before the first bit position.

Example 170 includes the subject matter of Example 168 or 169, and optionally, wherein a count of bits in the predefined bit sequence is equal to a count of bits from a zero bit position to a bit position, which is immediately before the first bit position.

Example 171 includes the subject matter of any one of Examples 168-170, and optionally, wherein the predefined bit sequence comprises an implementation specific value.

Example 172 includes the subject matter of any one of Examples 168-171, and optionally, wherein the instructions, when executed, cause the first WUR STA to determine the adjusted temporal value by adding to the temporal value a sum of the local PHY delay of the first WUR STA and a time since reception of a first bit of the partial TSF value at a Media Access Control (MAC)/PHY interface of the first WUR STA.

Example 173 includes the subject matter of any one of Examples 168-172, and optionally, wherein the instructions, when executed, cause the first WUR STA to adjust a sequence of Most Significant bits (MSBs) of the local TSF timer from a bit position immediately after the second bit position based on a comparison between an MSB of the adjusted partial TSF value and a bit of the local TSF timer at the second bit position.

Example 174 includes the subject matter of Example 173, and optionally, wherein the instructions, when executed, cause the first WUR STA to adjust the sequence of MSBs of the local TSF timer, when the MSB of the adjusted partial TSF value is not equal to the bit of the local TSF timer at the second bit position.

Example 175 includes the subject matter of any one of Examples 168-174, and optionally, wherein the instructions, when executed, cause the first WUR STA to determine a duty cycle of a Wake-Up Receiver (WURx) of the first WUR STA based on the local TSF timer.

Example 176 includes the subject matter of any one of Examples 168-175, and optionally, wherein the first WUR STA comprises a non Access-Point (AP) (non-AP) STA.

Example 177 includes an apparatus of wireless communication by a first Wake-Up Radio (WUR) wireless communication station (STA), the apparatus comprising means for processing a WUR beacon frame from a second WUR STA, the WUR beacon frame comprising a partial Time Synchronization Function (TSF) value of a TSF timer of the second WUR STA, the partial TSF value comprising a partial sequence of TSF bits of the TSF timer from a first bit position to a second bit position; means for generating a temporal value by concatenating a predefined bit sequence with the partial sequence of TSF bits; means for determining an adjusted temporal value by adjusting the temporal value based on a local Physical layer (PHY) delay of the first WUR STA; means for determining an adjusted partial TSF value comprising bits of the adjusted temporal value from the first bit position to the second bit position; and means for setting a local TSF timer of the first WUR STA based on the adjusted partial TSF value by setting bits of the local TSF timer from the first bit position to the second bit position to the adjusted partial TSF value.

Example 178 includes the subject matter of Example 177, and optionally, wherein the predefined bit sequence represents assumed bits from a bit position zero to a bit position, which is immediately before the first bit position.

Example 179 includes the subject matter of Example 177 or 178, and optionally, wherein a count of bits in the predefined bit sequence is equal to a count of bits from a zero bit position to a bit position, which is immediately before the first bit position.

Example 180 includes the subject matter of any one of Examples 177-179, and optionally, wherein the predefined bit sequence comprises an implementation specific value.

Example 181 includes the subject matter of any one of Examples 177-180, and optionally, comprising means for determining the adjusted temporal value by adding to the temporal value a sum of the local PHY delay of the first WUR STA and a time since reception of a first bit of the partial TSF value at a Media Access Control (MAC)/PHY interface of the first WUR STA.

Example 182 includes the subject matter of any one of Examples 177-181, and optionally, comprising means for adjusting a sequence of Most Significant bits (MSBs) of the local TSF timer from a bit position immediately after the second bit position based on a comparison between an MSB of the adjusted partial TSF value and a bit of the local TSF timer at the second bit position.

Example 183 includes the subject matter of Example 182, and optionally, comprising means for adjusting the sequence of MSBs of the local TSF timer, when the MSB of the adjusted partial TSF value is not equal to the bit of the local TSF timer at the second bit position.

Example 184 includes the subject matter of any one of Examples 177-183, and optionally, comprising means for determining a duty cycle of a Wake-Up Receiver (WURx) of the first WUR STA based on the local TSF timer.

Example 185 includes the subject matter of any one of Examples 174-184, and optionally, wherein the first WUR STA comprises a non Access-Point (AP) (non-AP) STA.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
memory circuitry; and
a processor comprising logic and circuitry configured to cause a Wake-Up Radio (WUR) non-Access Point (non-AP) station (STA) to:
process a WUR frame from a WUR AP, the WUR frame comprising a partial Time Synchronization Function (TSF) value of a TSF timer of the WUR AP, the partial TSF value comprising a partial sequence of TSF bits of the TSF timer from a first bit position to a second bit position;
generate a temporal value by concatenating the partial sequence of TSF bits with a bit sequence;
determine an adjusted temporal value by adjusting the temporal value based on a delay of the WUR non-AP STA through local Physical layer (PHY) components of the WUR non-AP STA;
set an adjusted partial TSF value as a value of bits of the adjusted temporal value from the first bit position to the second bit position; and
set a local TSF timer of the WUR non-AP STA based on the adjusted partial TSF value.

2. The apparatus of claim 1 configured to cause the WUR non-AP STA to set bits of the local TSF timer, from the first bit position to the second bit position, to the adjusted partial TSF value.

3. The apparatus of claim 1, wherein the partial TSF value comprises bits [X:Y] of the TSF timer of the WUR AP, wherein X>0 and Y>X, and wherein the bit sequence comprises X bits representing an assumed value of bits [0:X−1].

4. The apparatus of claim 1 configured to cause the WUR non-AP STA to adjust a sequence of Most Significant bits (MSBs) of the local TSF timer from a bit position immediately after the second bit position based on a comparison between an MSB of the adjusted partial TSF value and a bit of the local TSF timer at the second bit position.

5. The apparatus of claim 4 configured to cause the WUR non-AP STA to adjust the sequence of MSBs of the local TSF timer, when the MSB of the adjusted partial TSF value is not equal to the bit of the local TSF timer at the second bit position.

6. The apparatus of claim 4 configured to cause the WUR non-AP STA to adjust the sequence of MSBs of the local TSF timer by increasing the sequence of MSBs of the local TSF timer by one unit or decreasing the sequence of MSBs of the local TSF timer by one unit, based on a comparison between bits of the local TSF timer, from the first bit position to the second bit position, and the adjusted partial TSF value.

7. The apparatus of claim 4 configured to cause the WUR non-AP STA to adjust the sequence of MSBs of the local TSF timer by setting a value of bits [(Y+1):63] of the local TSF timer as follows:
increase the value of bits [(Y+1):63] of the local TSF timer by one unit (modulo $2^{(63-Y)}$) if LT[X:Y]>AT and LT[X:Y]>AT+$2^{(Y-X)}$; and
decrease the value of bits [(Y+1):63] of the local TSF timer by one unit (modulo $2^{(63-Y)}$) if LT[X:Y]<AT and LT[X:Y]<AT−$2^{(Y-X)}$,
wherein:
X denotes the first bit position,
Y denotes the second bit position,
AT denotes the adjusted partial TSF value, and
LT[X:Y] denotes the value of bits X to Y of the local TSF timer.

8. The apparatus of claim 1 configured to cause the WUR non-AP STA to determine the adjusted temporal value by adding to the temporal value the delay of the WUR non-AP STA through the local PHY components, and a time since reception of a first bit of the partial TSF value at a Media Access Control (MAC)/PHY interface of the WUR non-AP STA.

9. The apparatus of claim 1, wherein the bit sequence comprises an implementation specific value.

10. The apparatus of claim 1, wherein a count of bits in the bit sequence is equal to a count of bits from a zero bit position to a bit position, which is immediately before the first bit position.

11. The apparatus of claim 1, wherein the WUR frame comprises a WUR beacon frame from the WUR AP.

12. The apparatus of claim 11 configured to cause the WUR non-AP STA to perform a WUR duty cycle operation based on TSF synchronization with the WUR AP according to the partial TSF timer value in the WUR beacon frame.

13. The apparatus of claim 1 comprising a receiver to receive the WUR frame.

14. The apparatus of claim 13 comprising one or more antennas connected to the receiver, and another processor to execute instructions of an operating system (OS) of the WUR non-AP STA.

15. A product comprising one or more tangible computer-readable non-transitory storage media comprising computer-executable instructions operable to, when executed by at least one processor, enable the at least one processor to cause a Wake-Up Radio (WUR) non-Access Point (non-AP) station (STA) to:
process a WUR frame from a WUR AP, the WUR frame comprising a partial Time Synchronization Function (TSF) value of a TSF timer of the WUR AP, the partial TSF value comprising a partial sequence of TSF bits of the TSF timer from a first bit position to a second bit position;
generate a temporal value by concatenating the partial sequence of TSF bits with a bit sequence;
determine an adjusted temporal value by adjusting the temporal value based on a delay of the WUR non-AP STA through local Physical layer (PHY) components of the WUR non-AP STA;
set an adjusted partial TSF value as a value of bits of the adjusted temporal value from the first bit position to the second bit position; and set a local TSF timer of the WUR non-AP STA based on the adjusted partial TSF value.

16. The product of claim 15, wherein the instructions, when executed, cause the WUR non-AP STA to set bits of the local TSF timer, from the first bit position to the second bit position, to the adjusted partial TSF value.

17. The product of claim 15, wherein the instructions, when executed, cause the WUR non-AP STA to adjust a sequence of Most Significant bits (MSBs) of the local TSF timer from a bit position immediately after the second bit position based on a comparison between an MSB of the adjusted partial TSF value and a bit of the local TSF timer at the second bit position.

18. The product of claim 15, wherein the instructions, when executed, cause the WUR non-AP STA to determine the adjusted temporal value by adding to the temporal value the delay of the WUR non-AP STA through the local PHY components, and a time since reception of a first bit of the partial TSF value at a Media Access Control (MAC)/PHY interface of the WUR non-AP STA.

19. The product of claim 15, wherein the bit sequence comprises an implementation specific value.

20. The product of claim 15, wherein the WUR frame comprises a WUR beacon frame from the WUR AP.

21. The product of claim 20, wherein the instructions, when executed, cause the WUR non-AP STA to perform a WUR duty cycle operation based on TSF synchronization with the WUR AP according to the partial TSF timer value in the WUR beacon frame.

22. An apparatus comprising:
means for causing a Wake-Up Radio (WUR) non-Access Point (non-AP) station (STA) to process a WUR frame from a WUR AP, the WUR frame comprising a partial Time Synchronization Function (TSF) value of a TSF timer of the WUR AP, the partial TSF value comprising a partial sequence of TSF bits of the TSF timer from a first bit position to a second bit position;
means for causing the WUR non-AP STA to generate a temporal value by concatenating the partial sequence of TSF bits with a bit sequence;
means for causing the WUR non-AP STA to determine an adjusted temporal value by adjusting the temporal value based on a delay of the WUR non-AP STA through local Physical layer (PHY) components of the WUR non-AP STA;
means for causing the WUR non-AP STA to set an adjusted partial TSF value as a value of bits of the adjusted temporal value from the first bit position to the second bit position; and
means for causing the WUR non-AP STA to set a local TSF timer of the WUR non-AP STA based on the adjusted partial TSF value.

23. The apparatus of claim 22 comprising means for causing the WUR non-AP STA to adjust a sequence of Most Significant bits (MSBs) of the local TSF timer from a bit position immediately after the second bit position based on a comparison between an MSB of the adjusted partial TSF value and a bit of the local TSF timer at the second bit position.

* * * * *